(12) United States Patent
Chanler et al.

(10) Patent No.: US 11,157,184 B2
(45) Date of Patent: Oct. 26, 2021

(54) HOST ACCESS TO STORAGE SYSTEM METADATA

(71) Applicant: EMC IP Holding Company LLC, Hopkinton, MA (US)

(72) Inventors: Andrew L. Chanler, Berlin, MA (US); Kevin M. Tobin, Hopedale, MA (US); Gabi Benhanokh, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/398,624

(22) Filed: Apr. 30, 2019

(65) Prior Publication Data

US 2020/0348867 A1 Nov. 5, 2020

(51) Int. Cl.
*G06F 3/06* (2006.01)
*G06F 16/908* (2019.01)
*G06F 12/1009* (2016.01)

(52) U.S. Cl.
CPC ............ *G06F 3/0635* (2013.01); *G06F 3/067* (2013.01); *G06F 3/0611* (2013.01); *G06F 3/0638* (2013.01); *G06F 3/0665* (2013.01); *G06F 12/1009* (2013.01); *G06F 16/908* (2019.01)

(58) Field of Classification Search
None
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 5,918,229 A * | 6/1999 | Davis | G06F 11/0757 711/147 |
| 6,968,369 B2 | 11/2005 | Veprinsky et al. | |
| 7,054,883 B2 | 5/2006 | Meiri et al. | |
| 8,375,174 B1 * | 2/2013 | Cartmell | G06F 12/0692 711/148 |
| 8,862,832 B1 | 10/2014 | Cartmell et al. | |
| 9,348,752 B1 * | 5/2016 | Parakh | G06F 11/1446 |
| 9,836,243 B1 | 12/2017 | Chanler et al. | |
| 10,482,029 B1 | 11/2019 | Chanler et al. | |

(Continued)

OTHER PUBLICATIONS

U.S. Appl. No. 16/389,383, filed Apr. 19, 2019, Wigmore, et al.

*Primary Examiner* — Tracy C Chan
(74) *Attorney, Agent, or Firm* — Muirhead and Saturnelli, LLC

(57) ABSTRACT

A host system performs I/O processing using metadata for a storage system, where none or some of the metadata is stored on the host system. The host system may be coupled to the global memory of the storage system along a communication path that includes an internal switching fabric of the storage system and does not include a network located externally to the storage system. The host system may exchange communications over the communication path to access indirection layers on the storage system to determine a global memory address of metadata corresponding to an I/O operation. The host system may include a host metadata table of global memory addresses for metadata of logical locations logical devices. The host system may query the host metadata table for a global memory address of metadata corresponding to a logical location specified in an I/O operation.

20 Claims, 16 Drawing Sheets

(56) References Cited

U.S. PATENT DOCUMENTS

2012/0226855 A1\* 9/2012 Dhuse ................ G06F 11/0757
711/114
2015/0301934 A1\* 10/2015 Baderdinni ........... G06F 3/0631
711/103

\* cited by examiner

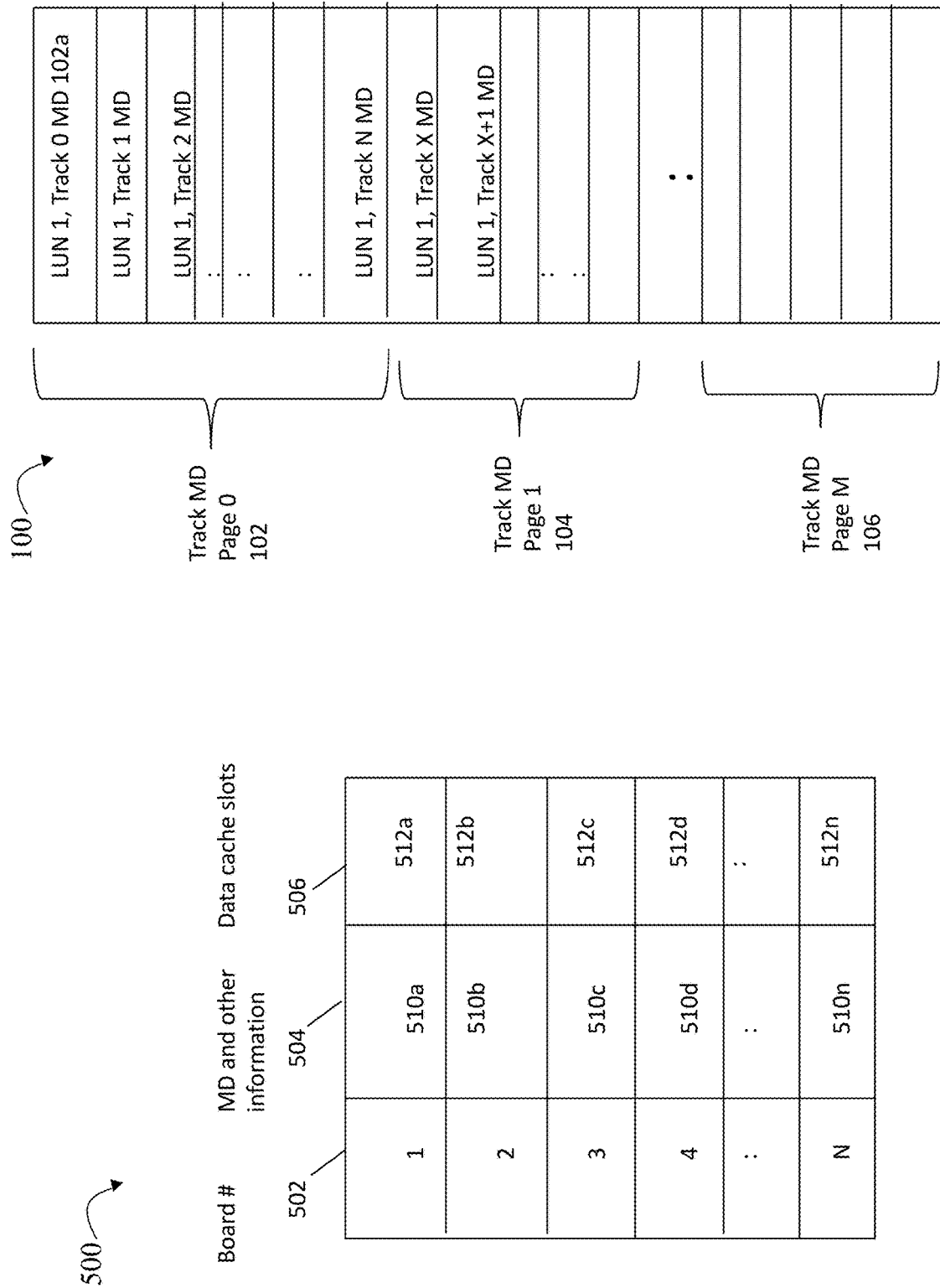

HOST ACCESS TO STORAGE SYSTEM METADATA

BACKGROUND

Technical Field

This application generally relates to data storage systems, and more particularly to sharing metadata of data stored on a data storage system with a host.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments of the invention, a method of a host system processing an I/O operation is performed. The method includes receiving the I/O operation originating from an application and directed to a logical location within a logical storage device of a storage system, and. the host system determining a global memory address within a global memory of the storage system at which first metadata corresponding to the I/O operation resides, including, if the global memory address is not available on the host system, the host system accessing at least a first indirection layer on the storage system. Accessing the at least first indirection layer includes the host system exchanging one or more communications with the global memory over an internal switching fabric of the storage system along a communication path from the host system to the global memory that does not include a network located externally to the storage system. The host system may include a metadata table including one or more entries, each entry associated with a logical location of a logical storage device of the storage system, where the method may further includes querying the metadata table for the global memory address of the first metadata, and the host system may access the at least first indirection layer is performed responsive to determining that the metadata table does not include the global memory address of the first metadata. The metadata table may have capacity to accommodate a predetermined number of entries, and the method may further include evicting one or more entries from the metadata table over time according to an LRU eviction policy. The method may further include adjusting a size of the metadata table based on a balancing between memory consumption and performance on the host system. The first metadata may include information specifying a physical location on a physical storage device mapped to the logical location. The first indirection layer may include a plurality of pointers to pages of metadata for the logical storage device, and the method may further include accessing, in global memory, a page descriptor corresponding to a first page of the pages of metadata, the page descriptor specifying: data stored in the first page, or that the first page is free. A plurality of indirection layers include the first indirection layer, and wherein the plurality of indirection layers are used to obtain the global memory address of the first metadata.

In some embodiments, a host system includes one or more processors and memory including code stored thereon that, when executed, performs the above described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is a block diagram illustrating an example of a logical representation of data that may be stored in a distributed GM of different circuit boards, according to embodiments of the invention;

FIG. 4 is a block diagram illustrating an example of track MD pages, according to embodiments of the invention;

DETAILED DESCRIPTION OF EMBODIMENT(S)

Figure 1:
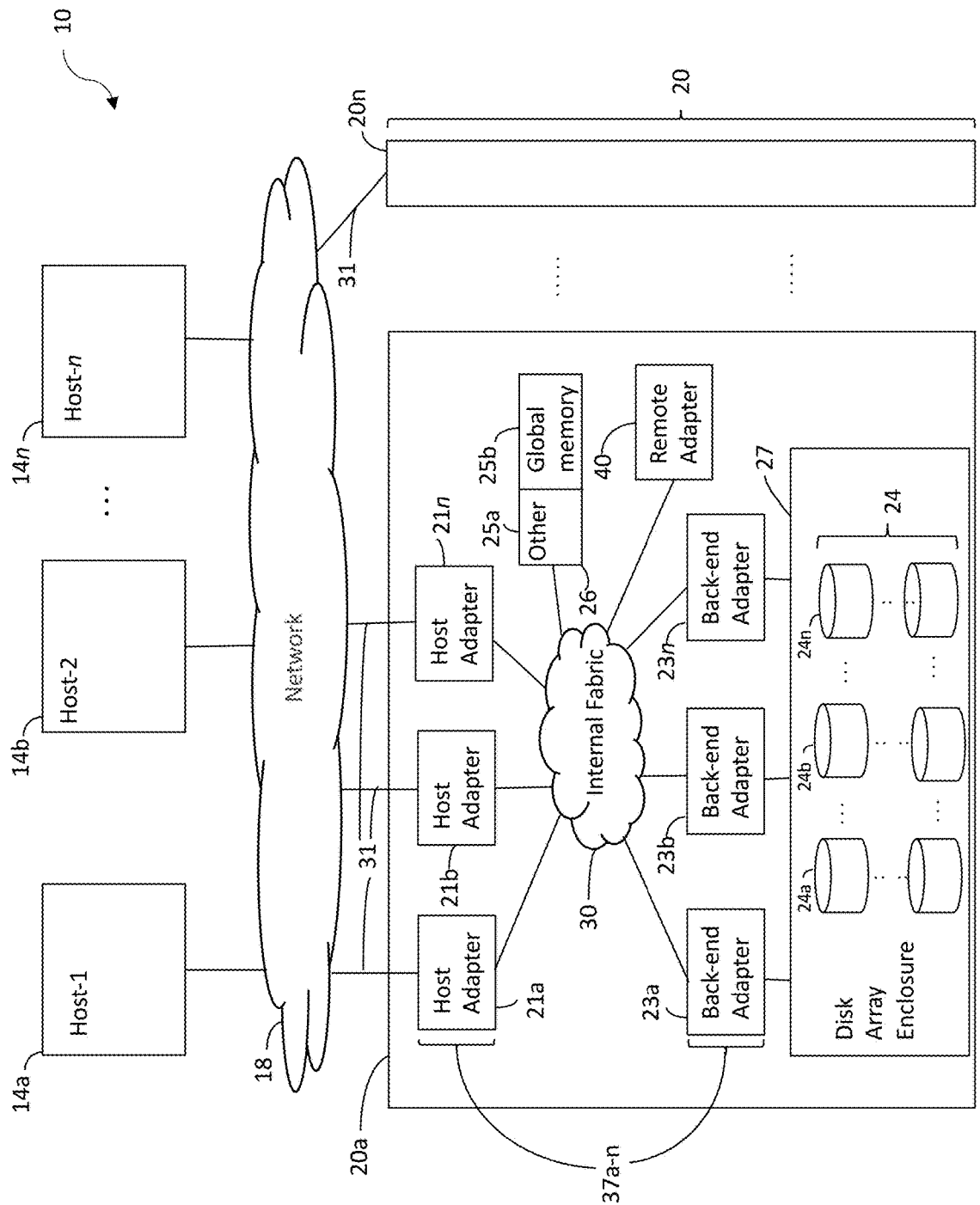
FIG. 1 is a block diagram illustrating an example of a data storage network.

As described in more detail herein, for some storage systems, host systems may not address the physical storage devices (e.g., disk drives or solid state drives) of the storage system directly, but rather access to data may be provided to one or more host systems from what the host systems view as a plurality of logical storage devices (or simply "logical devices"), including, for example, LUNs, namespaces, thin devices, groups of logical devices (e.g., storage groups), other types of logical devices, or portions thereof. In such storage systems, the storage system may maintain metadata (also referred to herein as meta data or MD) about the logical devices and portions thereof, including (among other information) the one or more physical storage devices and portions thereof to which the logical devices and portions thereof map. Depending on the size (i.e., storage capacity) of the storage system, the MD itself can grow quite large, consuming a significant amount of memory resources, for example, of a global memory (GM) of the storage system.

Further, in some storage systems, the GM of the storage system may be distributed across one or more separate physical components, e.g., circuit boards, as described in more detail elsewhere herein. For example, each separate physical component may provide a GM segment, the collective GM segments constituting a distributed GM. In such cases, for storage systems having a large amount of MD, it may be desirable to distribute the MD across the multiple GM segments, and use one or more data structures to indirectly reference each portion of MD stored on one or more of the physical components, thereby conserving GM resources of the storage system.

In some embodiments of the invention, a host system is directly connected to an internal switching fabric of a storage system, as described in more detail herein, and may include a storage system interface (SSI) that serves as an interface between the host system and storage system. The SSI may be located externally from the storage system, but be physically connected directly to the internal fabric of the storage system. The SSI may be configured to provide I/O functionality traditionally provided by the storage system itself, more specifically, by directors of the storage system, as described in more detail herein, thereby providing the ability to offload I/O processing from the storage system to one or more hosts, as well as providing other potential benefits. To this end, the SSI may be configured to use MD of the storage system (e.g., corresponding to logical devices) to implement I/O functionality. However, the SSI may have limited memory resources, perhaps substantially less memory resources than the storage system (e.g., a distributed GM), making it impractical, infeasible or at best undesirable to store the MD or even a portion thereof on the SSI.

What is desired is system and technique by which I/O processing can be performed on (e.g., offloaded to) a host system, whereby MD for storage system data can be utilized by the host system to perform I/O processing, while controlling memory consumption on the host system and achieving acceptable performance.

Described herein is a system and techniques in which a host system performs I/O processing using MD for data corresponding to (e.g., stored on or to be stored on) a storage system, wherein none or some of the MD is stored on the host system. The host system may be coupled to the GM (e.g., a distributed GM) of the storage system along a communication path from the host system to the GM that includes an internal switching fabric of the storage system and does not include a network located externally to the storage system. The storage system may include one or more indirection layers described in more detail elsewhere herein. For a logical location (e.g., a logical address range, e.g., as specified by a logical device identifier and offset) within a logical device, the one or more indirection layers may specify (via one or more reference pointers) an address range within the GM holding MD for the logical location. The host system may exchange communications over the communication path to access at least a first of the one or more indirection layers to determine a GM address range (often referred to herein as a "GM address") of MD corresponding to a logical location specified in an I/O operation, for example, without use of any director compute resources on the storage system. In some embodiments, at least a portion of the one or more indirection layers themselves may be stored on the host system, for example, as a local copy of what is stored on the storage system. As used herein, the term "indirection layer" may be refer to a data structure representing an indirection layer; i.e., a data structure including information that defines the indirection layer.

In some embodiments, the host system may include a host MD table (e.g., hash table) in which GM addresses for MD of logical locations of logical devices are stored. For example, the host MD table may include a plurality of entries, each entry representing a logical location and including an identifier (e.g., hash) of the logical location. For a logical location (e.g., specified in an I/O operation), the host system may query the host MD table for a GM address of MD corresponding to the logical location. If the host MD table does not include an entry for the logical location, the host system may access one or more indirection layers, for example, in GM of the storage system to determine the GM address of the MD.

In some embodiments, the internal fabric may exhibit low latency, resulting in relatively low-latency communications between the host system and GM, such that the performance hit from the host system accessing the GM on the storage system, compared to accessing the host MD table on the host itself, is relatively small. The size of the host MD table—i.e., the number of entries and/or the amount of information stored therein—may be adjusted depending on the amount of memory available on the host system (e.g., on an SSI of the host system) and a desired balance between memory consumption on the host system and I/O performance. This size adjustment may be done dynamically during performance of I/O operations (i.e., during "runtime"), for example, to consume only the amount of memory necessary; e.g., to only have entries for logical location and/or logical devices having recent I/O activity, thereby freeing up unneeded memory for other uses, which may improve I/O performance. In some embodiments, one or more (e.g., all) entries in the MD table may be cleared in response to an event, e.g., user input, which may be done to free-up memory irrespective of recent I/O activity. In some embodiments, to minimize memory consumption, the host system may not include a host MD table, but rather only access one or more indirection layers to determine MD GM addresses.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications between one or more physical storage devices 24 may be controlled by a specific BE. BEs 23a-n may employ one or more technologies in communicating with, and transferring data to/from, physical storage devices 24a-n, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be a Fibre Channel (FC) adapter if FC is the technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems, such as between two of the same or different types of storage systems, and/or may be implemented using a director.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, a sending one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet and Gen-Z. Other technologies may be used.

The GM portion 25b may be used to facilitate data transfers and other communications between the directors 37a-n in a storage system. In one embodiment, the directors 37a-n (e.g., serving as FAs or BEs) may perform data operations using a cache that may be included in the GM 25b, for example, in communications with other directors, and other components of the system 20a. The other portion 25a is that portion of memory that may be used in connection with other designations that may vary in accordance with each embodiment. Global memory 25b and cache are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache memory (e.g., such as may be included in the component designated as 25b) and marked as write pending. For example, a cache may be partitioned into one or more portions called cache slots, which may be a of a predefined uniform size, for example 128 Kbytes. Write data of a write operation received at the storage system may be initially written (i.e., staged) in one or more of these cache slots and marked as write pending. Once written to cache, the host may be notified that the write operation has completed. At a later time, the write data may be de-staged from cache to the physical storage device, such as by a BE.

It should be generally noted that the elements 24a-n denoting physical storage devices may be any suitable physical storage device such as, for example, a rotating disk drive, SSD (e.g., flash) drive, NVMe drive or other type of storage, and the particular type of physical storage device described in relation to any embodiment herein should not be construed as a limitation.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20a-n, or one or more components thereof, described in relation to FIGS. 1-2 may be implemented using one or more Symmetrix®, VMAX®, VMAX3® or PowerMax™ systems (hereinafter referred to generally as PowerMax storage systems) made available from Dell EMC.

Host systems 14a-n may provide data and access control information to storage systems 20a-n over a plurality of I/O paths defined between the host systems and storage systems, for example, including host system components, storage system components, and networks components (e.g., of network 18), and the storage systems also may provide data to the host systems across the I/O paths. In the embodiment of FIG. 1, the host systems do not address the physical storage devices (e.g., disk drives or flash drives) 24 of the storage systems directly, but rather access to data may be provided to one or more host systems from what the host systems view as a plurality of logical storage devices (or simply "logical devices"), including, for example, LUNs, namespaces, thin devices, groups of logical devices (e.g., storage groups), and other types of logical devices. The logical devices may or may not correspond to the actual physical storage devices. For example, one or more logical devices may map to a single physical storage device; that is, the logical address space of the one or more logical device may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on logical device(s) mapped thereto. The unqualified term "storage device" as used herein means a logical device or physical storage device.

In an embodiment in accordance with techniques herein, the storage system as described may be characterized as having one or more logical mapping layers in which a logical device of the storage system is exposed to the host whereby the logical device is mapped by such mapping layers of the storage system to one or more physical devices. Additionally, the host also may have one or more additional mapping layers so that, for example, a host-side logical device or volume may be mapped to one or more storage system logical devices as presented to the host.

Any of a variety of data structures may be used to process I/O on storage system 20a, including data structures to manage the mapping of logical devices and locations thereon to physical storage devices and locations thereon. Such data structures may be stored in any of memory 26, including GM 25b and memory 25a, GM segment 220a-n and/or board local segments 222a-n. Thus, storage system 20a, and storage system 620a described in more detail elsewhere herein, may include memory elements (e.g. cache) that hold data stored on physical storage devices or that is currently held ("staged") and will be stored ("destaged") to physical storage devices, and memory elements that store MD (e.g., any of the MD described herein) associated with such data. Illustrative examples of data structures for holding such MD will now be described.

Figure 2:
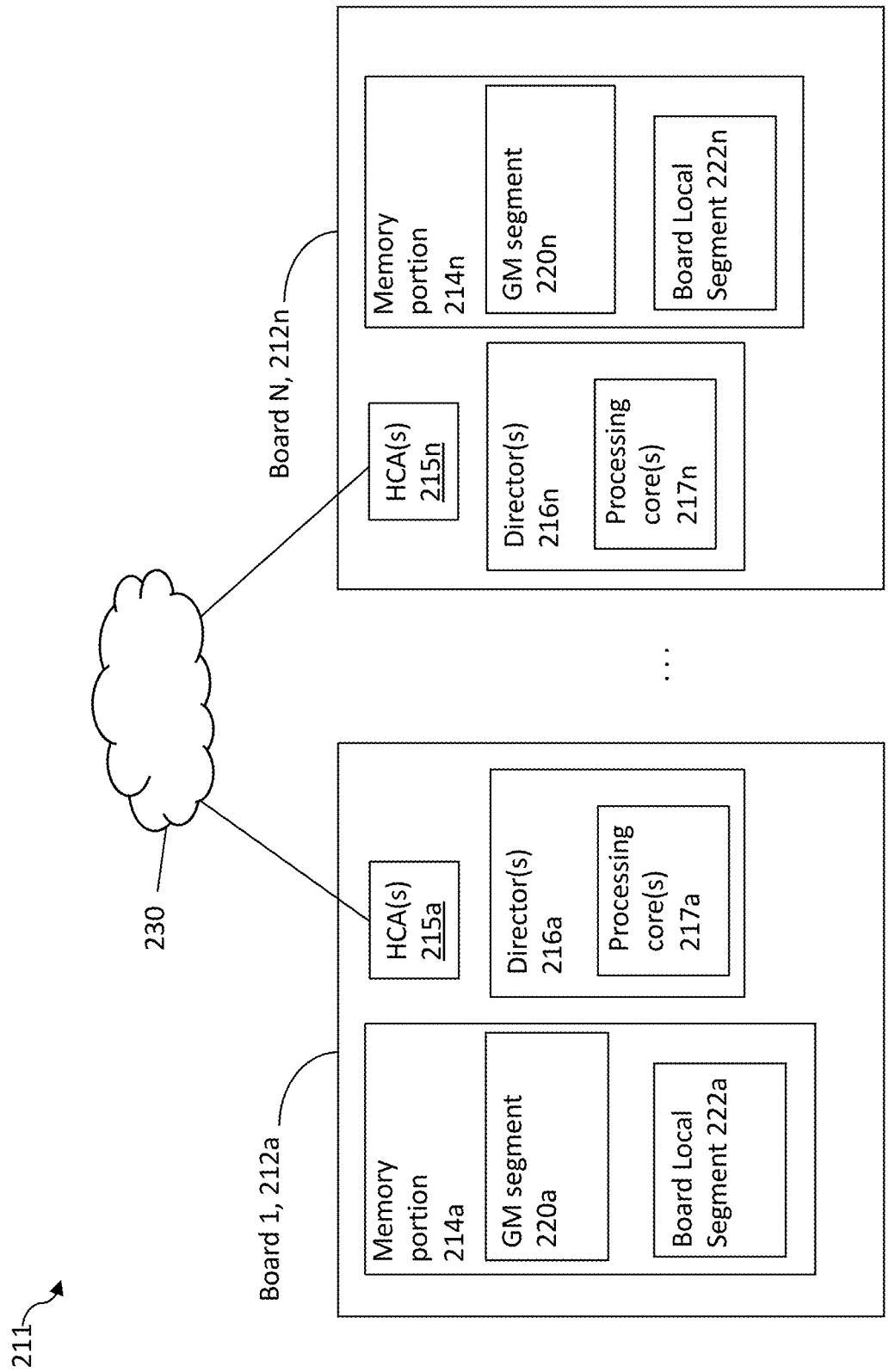
FIG. 2 is a block diagram illustrating an example of a storage system including multiple circuit boards.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, MD, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM, which may be mirrored in a distributed fashion across the GM segments 220a-n. In at least one embodiment, the distributed GM formed by GM segments 220a-n may include the data cache, various MD and/or structures, and other information, as described in more detail elsewhere herein. Consistent with discussion herein, the data cache, having cache slots allocated from GM segments 220a-n, may be used to store I/O data (e.g., for servicing read and write operations).

Referring to FIG. 3, shown is an example 500 illustrating a logical representation of data that may be stored in the distributed GM of the different boards 212a-n in an embodiment in accordance with techniques herein. The example 500 illustrates portions of the distributed cache, and thus distributed GM, in an embodiment including N boards, such as illustrated in FIG. 3. Column 502 denotes the particular board number or identifier, column 504 denotes the various MD and other information stored in GM across the GM segments 220a-n of boards 212a-n, and column 506 denotes the data cache slots stored in the GM segments 220a-n of the boards 212a-n.

Elements 510a-510n, respectively, denote the MD and other information stored collectively in the GM segments 220a-n of the N boards 212a-n (as identified in column 502). Elements 512a-n, respectively, denote the data cache slots stored collectively in the GM segments 220a-n of N boards 212a-n. In this manner, columns 504, 506 respectively denote a logical representation of the aggregated data that may be stored in the distributed GM of the data storage system. Each of 510a-n denotes a portion of the MD and other information stored in one of the GM segments 220a-n. For example, element 510a may denote the MD and other information of board 1 212a stored in GM segment 220a where GM segment 220a is local to the board 212a; element 510b may denote the MD and other information of board 2 212b stored in GM segment 220b where GM segment 220b is local to the board 212b; and so on with respect to each row of table 500 for a different one of the N boards.

Consistent with discussion elsewhere herein, the example 500 illustrates some of the data and information that may be included in memory portions 214a-n respectively on the boards 212a-n. More generally, an embodiment in accordance with techniques herein may also store other types of data and information in other regions of the memory portions 214a-n.

Referring to FIG. 4, shown is an example of MD that may be used in an embodiment in accordance with techniques herein. In one embodiment, the user data may be arranged in units of storage, such as tracks of a LUN where each track is of a particular size, such as 128 Kbytes of user data per track. For each track, there may exist user data and associated MD. In the example 100, MD may be maintained for each track of a LUN whereby, for example, I/O operations from a host may be directed to a logical address or offset, such as a track, on the LUN. In this case, the data storage system uses MD for the track in connection with servicing the I/O operation. The example 100 illustrates a logical structure or arrangement including an entry for the MD per track. It should be noted that the track and examples of particular track size as described herein are merely illustrative of one particular unit of storage that may be used in an embodiment in accordance with techniques herein. More generally, an embodiment may use any suitable size and type of storage unit to denote a logical offset, address, location, and the like, on a LUN (e.g., whereby data may be stored at the logical offset, address location, and like, on the LUN).

The MD may be generally partitioned into multiple categories. In one embodiment, the MD categories may include:

1. Location information. Location information may include, for example, the physical device storage location denoting where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for a track of a LUN may include location MD identifying the physical storage location mapped to the track. Location information may include, for example, cache location information denoting if the user data is stored in cache and if so, identify the location in the cache where the user data is stored.

2. Data Description. Data description information may include, for example, a checksum or other information describing the user data. For example, the checksum may be used to verify or validate the user data's validity when read from physical non-volatile storage, for example, to ensure there has not been user data corruption or error in connection with obtaining the user data from the physical storage. Use of a checksum in data validation and error detection is known in the art. A checksum is a count of the number of bits in a transmission unit that is included with the unit so that the receiver can check to see whether the same number of bits arrived. If the counts match, processing may determine that the complete transmission was received and there has been no error in the data transmitted.

3. Advanced functionality. Advanced functionality MD may relate to other data facilities or services. For example, an embodiment may support remote data replication such as, for example, the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Data storage device communication between Symmetrix™ data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

The advanced functionality MD may denote, for example, whether the user data is replicated by such a data facility such as the SRDF® product, whether the remote or replication copy of the user data is valid or up to date with the primary location copy of the user data, and the like.

Generally, the advanced functionality MD may also include MD about other data facilities or services, for example, regarding snapshots (e.g., such as whether data of a particular track/LUN is a snapshot or serves as a base data copy of which a snapshot is taken), compression (e.g., whether data of the track/LUN is compressed), deduplication, and the like.

In at least one embodiment, at least some of the above-noted types or categories of MD, such as the location information MD and the checksum or other information of the data description MD, may be stored per track as illustrated in FIG. 4. Each per track MD may be needed in connection with servicing I/O operations and may be stored in a form of fast memory or storage. For example, an embodiment may store MD (e.g., location information MD, checksum and other MD information used for data validation) for as many data tracks as possible in the cache, or more generally, in the distributed GM of the data storage system. Thus, storing the MD in cache or other form of fast storage provides for obtaining needed MD, such as location MD, in a timely manner to service I/O operations and other processing in connection with the associated user data.

The per track MD as discussed above may be stored in cache, or more generally the distributed GM. The example 100 illustrates per track MD as just described. Element 102 denotes that MD for a first set of tracks is stored in page 0 of the distributed GM (e.g., storage allocated from any one or more of GM segments 220a-n). Element 104 denotes that MD for a second set of tracks is stored in page 1 of the distributed GM. Element 106 denotes that MD for an Mth set of tracks is stored in page M of the distributed GM.

Generally, the amount of MD describing all user data, such as stored on LUNs configured in a data storage system, is large in size. Modern storage systems are capable of storing a large amount of user data and therefore a large amount of MD is needed to describe such user data. Additionally, the complexities of the modern data storage system, such as due to the available data services, may define a feature set requiring a lot of MD to describe each user data track. In some cases, the amount of user data and associated MD make it impractical to store all MD for all user data in GM. In other words, the size of the cache and GM is typically smaller than the amount of storage needed to store all the MD along with storing other necessary data in GM. In this case, a data storage system in accordance with techniques herein may use a paging mechanism for storing MD in cache, or more generally, the GM.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache, or more generally GM in an embodiment of a data storage system, paging may be performed in a similar manner where the primary storage is the GM and the secondary storage is the physical storage device (e.g., disk or flash-based non-volatile backend storage accessed by the BEs). Thus, MD may be retrieved from back-end physical storage as needed and stored in cache, such as for servicing read operations requesting user data associated with the MD. Once the MD is in cache or GM, such MD may be removed from cache or GM (e.g., evicted, removed, overwritten, paged out, and the like) as cache or GM locations storing such MD are needed in connection with other processing. A page may refer to a single unit or amount of memory located in the cache, or more generally, the distributed GM whereby data stored in each page in GM may be brought into GM (e.g., paged into GM) and also paged out of (e.g., evicted from) GM as may be needed. In at least one embodiment, various techniques such as may be used for general cache management (e.g., eviction policy for selecting data of cache slots for removal from cache, flushing policy for determining when and/or how much write pending data to flush from cache to non-volatile storage, and the like) may also be applied for use with distributed GM management.

It should be noted that storing the MD on back-end physical storage which is read and/or written to physical storage by the BE is one possible way in which an embodiment in accordance with techniques herein may store and access MD on a form of non-volatile storage. More generally, an embodiment may store the MD on any form of non-volatile storage and access such MD as needed in any suitable manner.

Without use of paging in at least one arrangement with distributed GM, the entire set of system MD (e.g., including per track MD for all LUNs or logical devices) may be stored in the distributed GM at all times. In connection with a system using paging of MD with a distributed GM (whereby the different types or categories of MD for LUNs as noted above may be paged out of GM), techniques described in following paragraphs may be used. Such techniques may be used with a distributed GM that pages MD in and out of the distributed GM. Techniques herein may utilize an indirection layer that resides in the distributed GM where the indirection layer may be significantly smaller in size than the per track MD itself. In at least one embodiment, the indirection layer may be a single level or layer that remains resident in GM (e.g., is not paged out of the distributed GM) and where the LUN track MD may be paged out of the distributed GM. Additionally, information of the indirection layer may be updated accordingly as MD pointed to, or referenced by, the indirection layer is paged in and/or out of the distributed GM. Generally, the indirection layer may include one or more levels of indirection (e.g., one or more levels of pointers that are GM addresses). In at least one embodiment including multiple indirection layers or levels, where the first referenced or highest indirection layer may not be paged out of GM and where pages of other remaining indirection layers may be paged out of GM in a manner similar to the track MD pages. Additionally, with techniques herein, each board 212a-n may include a page directory or local page table stored in its board local segment 222a-n of memory. The page directory or local page table for a particular board is its own board-local view of what MD is paged in to GM (e.g., stored at particular GM addresses). The foregoing and other aspects and details of techniques herein are described in more detail below.

Referring again to FIG. 4, the example 100 illustrates per track MD such as may be used in connection with performing I/O operations and other processing in connection with data stored on each particular track of a LUN. Also illustrated in 100 are track MD pages 102, 104 and 106 where each track MD page includes per track MD for a specified (e.g., an integer number) of tracks. The example 100 illustrates a logical set of pages including per track MD for a single LUN. In a similar manner, a different set of one or more track MD pages may include per track MD for each LUN in the system. Although the set of one or more pages 100 including a LUN's track MD may be logically viewed as a sequence of contiguous pages, each of the track MD pages may be physically located in non-contiguous locations in physical storage (e.g., in GM and also non-volatile storage).

In at least one embodiment in accordance with techniques herein, additional information for each LUN may also be stored in GM. Such additional information may include, for example, a per LUN MD object identifying the particular number of pages including track MD for each LUN. For example, a first LUN MD object for LUN 1 may indicate that M track MD pages (102-106) include track MD for LUN1. The M pages containing the LUN's MD may store the MD for tracks of the LUN based on sequential ordering of the tracks. The sequential ordering of per track MD for a LUN may facilitate locating MD of particular tracks of the LUN within the logical representation of the pages as in 100. Additionally, viewing the collective M pages as a contiguous logical representation, the MD of a particular track of a LUN may be expressed, for example, using a page number and logical offset or location within the page identified by the page number. In at least one embodiment, each page of track MD may include MD for only a single LUN (e.g., no page of track MD includes MD from 2 different LUNs).

In at least one embodiment in accordance with techniques herein, a page table may be used to map a logical page and offset (e.g., such as a track MD page and offset) to its corresponding physical memory location in GM (e.g., map a page number and offset to a corresponding GM address or physical page frame number and offset in GM). In at least one embodiment the page table may store the GM address of the physical page frame number and may not explicitly store the track offset within the page frame since, as discussed elsewhere herein, the offset may be calculated based on a constant or fixed number of tracks per page.

In connection with an embodiment in accordance with techniques herein, an indirection layer may be utilized where the indirection layer generally includes one or more levels of indirection.

Figure 5:
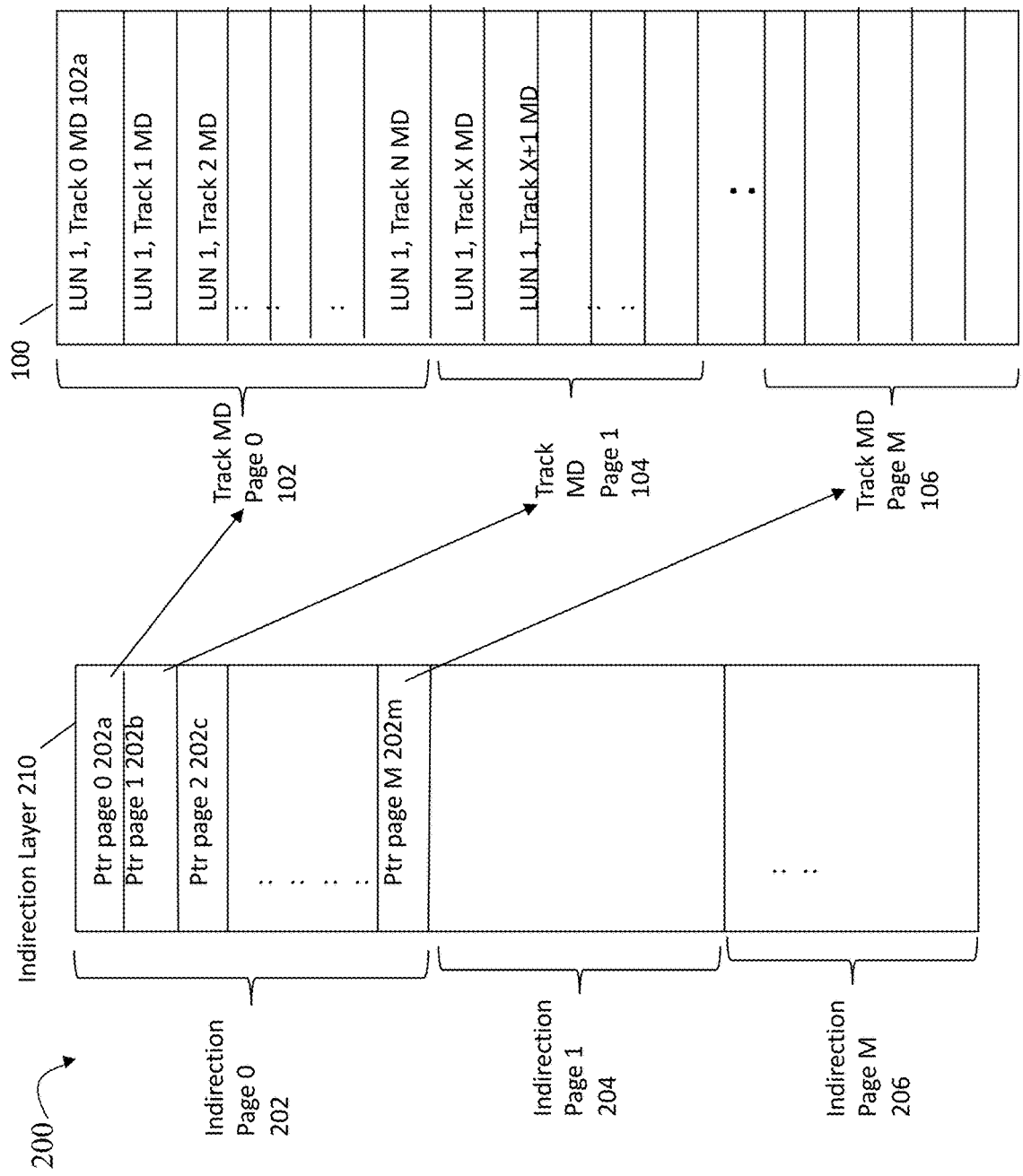
FIG. 5 is a block diagram illustrating an example of an indirection layer, according to embodiments of the invention.

With reference to FIG. 5, shown is an example 200 of structures that may be used in an embodiment in accordance with techniques herein with an indirection layer 210 including 1 level of indirection. The example 200 includes MD structure or table of the example 100 denoting the pages of track MD for tracks of the LUN as described above and illustrated in FIG. 4. Additionally, the example 200 includes indirection layer 210 which is generally a structure, such as a table, of entries where each entry is a pointer or reference to a different page of track MD stored in GM. For example entry 202a is a pointer to track MD page 0 102; entry 202b is a pointer to track MD page 1 104; and entry 202m is a pointer to track MD page M 106. Entries or elements 202a-m may also be referred to herein as indirection pointers to the actual pages of MD (e.g., track MD pages 102, 104 106). An integer number of indirection pointers of the indirection layer 210 may be included in a single page, also referred to as an indirection page. For example, M indirection pointers 202a-m may be included in the single indirection page 0, 202. In a similar manner, different sets of M indirection pointers may be included in each of the indirection pages 1 (204) through M (206) of the indirection layer 210.

In at least one embodiment, each entry in the indirection layer 210 that points to a track MD page may identify the GM address (e.g., physical address or location in GM such as page frame in GM) where that particular page of track MD is stored (if such page of track MD is currently paged into GM).

In one aspect the indirection layer 210 is itself another form of MD, indirection MD, comprising one or more MD pages of indirection pointers or GM addresses of pages of track MD. A page of the indirection layer MD 210, such as indirection page 0 202, may be used to store the indirection pointers or GM addresses (e.g., 202a-m) to the actual pages (e.g., track MD pages 0 (102) through M (106)) of per track MD of the structure 100. In at least one embodiment, the indirection layer 210 may also reside in pages of the distributed GM. Thus, each indirection page 202, 204, 206 may also be mapped to a corresponding GM address of a page frame and offset identifying a physical location in GM where such indirection page is stored.

As described in more detail elsewhere herein, the indirection layer 210 may be accessed, for example, by executing code of a director in connection with obtaining MD for a particular track of a LUN when performing processing to service an I/O operation directed to that particular track of the LUN. For example, assume an FA director 216a of board 212a receives an I/O operation directed to LUN 1, track 0 having its MD stored at entry or address 102a. The director 216a may access the track MD 102a using indirection layer 210. That is, using the indirection layer 210, the director 216a may obtain the indirection pointer 202a to MD page 0 (102) (e.g., whereby element 202a denotes the entry of the indirection layer 210 that includes the GM address to the beginning of track MD page 0 102 (e.g. address of entry 102a)). Using the address or indirection pointer 202a, the director 216a may then obtain the needed MD for LUN 1 track 0 from entry 102a of track MD page 0 102. Director 216a may also store in its board local segment 222a the address or indirection pointer 202a where the GM address references or points to track MD page 0 102. In this manner, using indirection pointer 202a, director 216a may subsequently obtain track MD directly from table 100 for any track included in track MD page 102 (e.g., MD for any of tracks 0-N of LUN as illustrated in the example 200 of FIG. 5).

Continuing with the above example regarding director 216a obtaining track MD for LUN 1, track 0, the GM address or indirection pointer 202a obtained from the indirection layer 210 may be stored and cached locally in the page directory or local page table in board local segment 222a. Generally, as described in more detail elsewhere herein, the page directory or local page table of each board may include pointers or GM addresses to pages of MD in the distributed GM. In one aspect, the page directory or local page table of each board may be viewed as a board local cache of at least some of the GM addresses of different track MD pages as stored in the indirection layer 210. In at least one embodiment, the page directory or local page table of each board may map a particular track MD page to its corresponding GM address of its physical location in GM (e.g., map a page number to its corresponding GM address or page frame number and offset in GM).

Generally, an embodiment in accordance with techniques herein may computationally determine the particular logical page (e.g., track MD page number) of the table 100, and also offset or location within the particular track MD page, which includes desired MD for a particular LUN and track. Similarly, an embodiment may computationally determine the particular indirection layer page (e.g., indirection page number of indirection layer 210), and also offset or location within the particular indirection layer page, that includes the GM address of the track MD page of the table 100 with the desired MD for the particular LUN and track. In at least one embodiment, such calculations may be based on the known or predetermined configuration regarding how many tracks have their corresponding MD stored in a single track MD page of the table 100, and how many page pointers or GM addresses of track MD pages may be stored in a single indirection layer page.

To illustrate, assume that each of the page of the table 100 stores track MD for 4 tracks (e.g., track MD page 102 stores track MD for 4 tracks); and each page of the indirection layer 210 stores 4 GM addresses or 4 pointers to 4 different track MD pages. Assume further that tracks for LUN 1 have their MD stored in consecutive entries of consecutive pages of track MD beginning with track MD page 0. In this case, the following identifies the particular indirection layer page number, entry or offset within the indirection page number, track MD page, and entry or offset within the track MD page that may be mapped to a particular track of LUN 1 to obtain desired track MD:

| Track # | Track MD page | Track MD page entry/offset | Indirection page | Indirection Page Entry/offset |
|---|---|---|---|---|
| 0 | 0 | 0 | 0 | 0 |
| 1 | 0 | 1 | 0 | 0 |
| 2 | 0 | 2 | 0 | 0 |
| 3 | 0 | 3 | 0 | 0 |
| 4 | 1 | 0 | 0 | 1 |
| 5 | 1 | 1 | 0 | 1 |
| 6 | 1 | 2 | 0 | 1 |
| 7 | 1 | 3 | 0 | 1 |
| 8 | 2 | 0 | 0 | 2 |
| 9 | 2 | 1 | 0 | 2 |
| 10 | 2 | 2 | 0 | 2 |
| 11 | 2 | 3 | 0 | 2 |
| 12 | 3 | 0 | 0 | 3 |
| 13 | 3 | 1 | 0 | 3 |
| 14 | 3 | 2 | 0 | 3 |
| 15 | 3 | 3 | 0 | 3 |
| 16 | 4 | 0 | 1 | 0 |
| 17 | 4 | 1 | 1 | 0 |
| 18 | 4 | 2 | 1 | 0 |
| 19 | 4 | 3 | 1 | 0 |
| 20 | 5 | 0 | 1 | 1 |
| 21 | 5 | 1 | 1 | 1 |

Figure 6A:
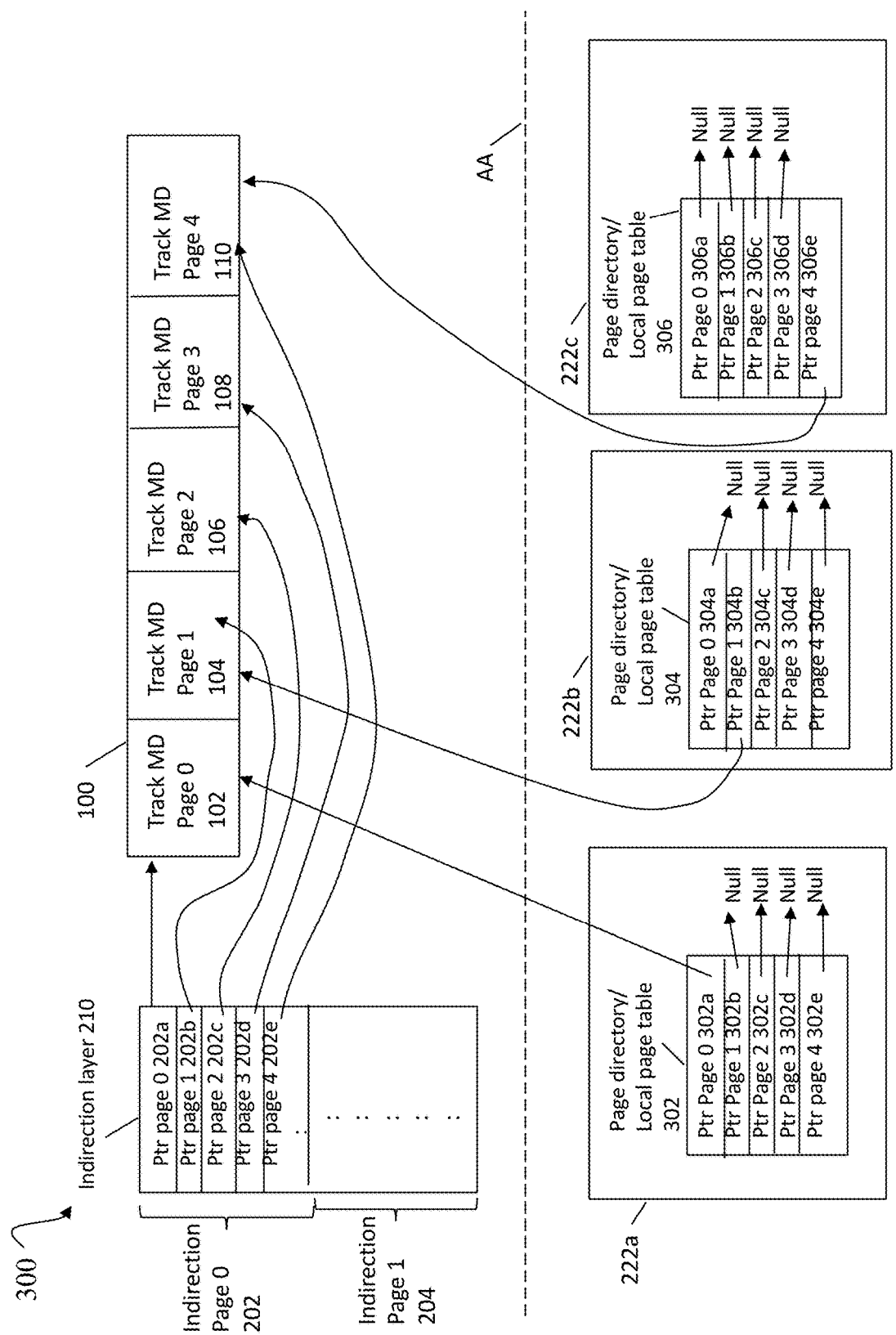
FIG. 6A is a block diagram illustrating an example of track MD, the indirection layer, and local page tables, according to embodiments of the invention.

Referring to FIG. 6A, shown is an example illustrating structures and information that may be used in an embodiment in accordance with techniques herein. The example 300 includes dashed line AA whereby structures above line AA may be stored in the distributed GM. Structures 302, 304 and 306 below dashed line AA may be stored, respectively in 3 different board local segments of memory 222a-c. The structures 210 and 100 in the example 300 which are in GM (e.g., above dashed line AA) may be as described above, for example in connection with FIG. 5. FIG. 6A also now illustrates the page directories or local page tables as may be maintained for use locally by the one or more directors of each of the boards 212a-n. For simplicity of illustration, the example 300 includes only 3 page directories or local page tables 302, 304, 306. However, consistent with discussion elsewhere herein, a page directory or local page table may be stored in the board local segment of memory on each of the boards 212a-n.

As illustrated, each of the local page tables 302, 304 and 306 may include GM addresses (identify GM locations) for different sets of track MD pages. In other words, the content of all local page tables is not the same and not required to be synchronized. For example, table 302 only includes a GM address 302a to the track MD page 0 102. Table 302 is illustrated as including null values for pointers or addresses 302b-e to indicate table 302 does not include GM addresses to track MD pages 104, 106, 108 and 110. Table 304 only includes a GM address 304b to the track MD page 1 104. Table 304 is illustrated as including null values for pointers or addresses 304a, 304c-e to indicate table 304 does not include GM addresses to track MD pages 102, 106, 108 and 110. Table 306 only includes a GM address 306e to the track MD page 4 110. Table 306 is illustrated as including null values for pointers or addresses 306a-d to indicate table 306 does not include GM addresses to track MD pages 102, 104, 106, and 108.

Assume a director on board 212a needs to obtain track MD for LUN 1, track 0. In this example, the director may use page directory or local page table 302 as stored in its board local memory segment 222a. The director may determine the track MD page containing the desired track MD, which based on FIG. 6A is track MD page 0 102. The director may then query its page directory or local page table 302 to lookup the GM address of the desired track MD page number 0 for LUN 1. In this case, the director determines that 302a of table 302 does include the GM address for track MD page 0, 102. Using the GM address obtained from table 302, the director may obtain the desired track MD from the particular offset in page 102 of GM, such as by issuing a request over the fabric 230.

Assume a second director on another board needs to obtain track MD for LUN 1, track 0. The second director may be included on the board having board local memory segment 222b and may use page directory or local page table 304. The second director may determine the track MD page containing the desired track MD, which based on FIG. 6A is track MD page 0 102. The second director may then query its page directory or local page table 304 to lookup the GM address of the desired track MD page number 0. In this case, the director determines that table 304 does not include the GM address for track MD page 0 (e.g., there is a "miss" whereby the page directory or local page table 304 does not include the GM address of the desired track MD page number 0, 102). Since table 304 does not include the GM address of the track MD page 0 102, the second director may query or lookup the GM address of the desired track MD page 0, 102 using the indirection layer 210. The second director may determine that the indirection page 0, 202, contains the desired GM address of the track MD page 0 in entry or offset 202a. The second director may then obtain, from 202a of the indirection page 0 202, the pointer to, or GM address of, track MD page 0 102. The second director may obtain the desired track MD from the particular offset in page 102 of GM, such as by issuing a request over the fabric 230.

Figure 6B:
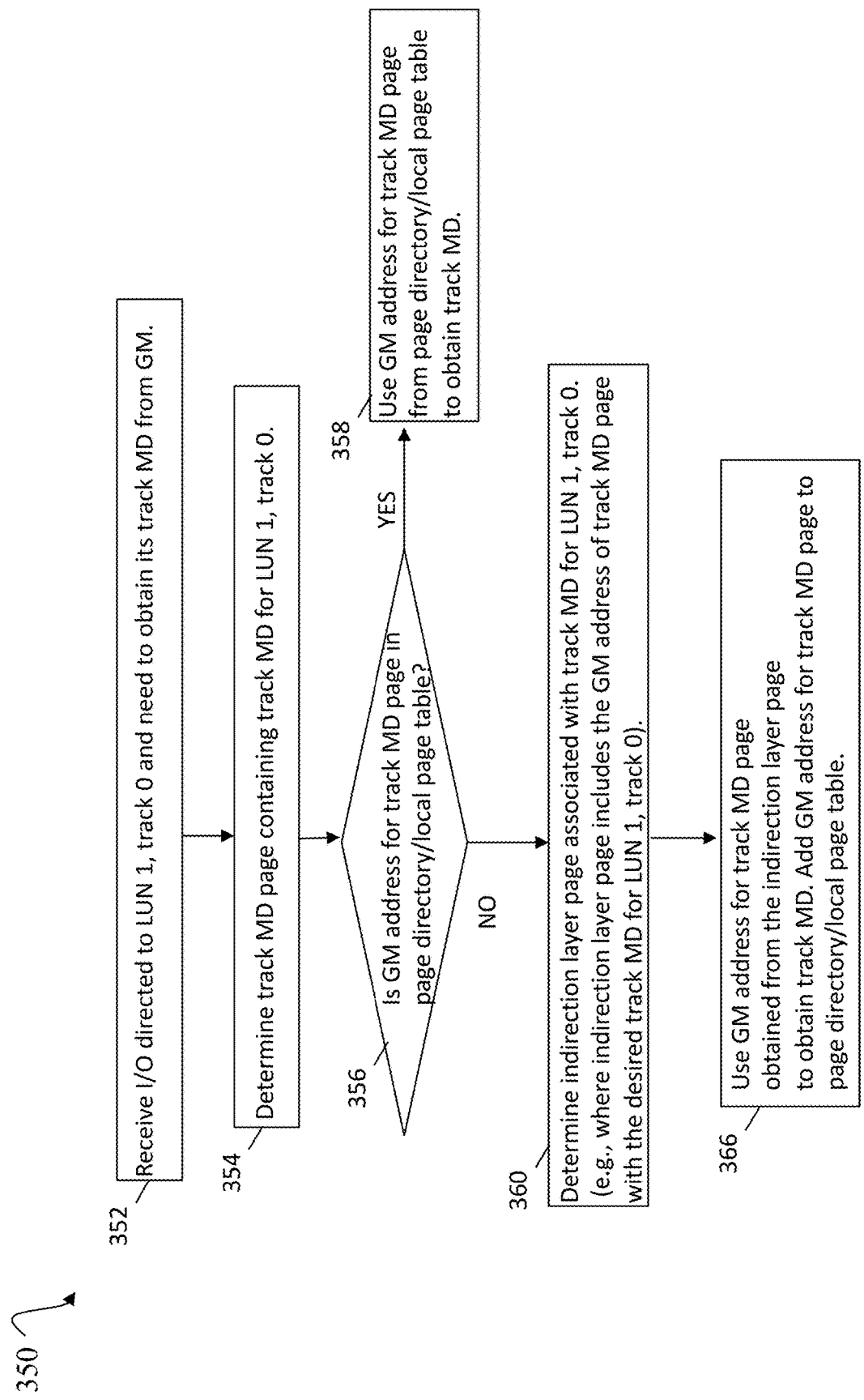
FIGS. 6B, 8, 9, 10, 12A and 12B are flowcharts illustrating examples of methods including processing steps that may be performed according to embodiments of the invention.

Referring to FIG. 6B, shown is a flowchart illustrating a method 350 of processing steps that may be performed in an embodiment in accordance with techniques herein. The method 350 generally summarizes processing as described above with reference to FIG. 6A such as for a director that needs to obtain track MD from GM for LUN 1, track 0. The director may be, for example, an FA that receives an I/O operation from a host. At step 352, the FA receives the I/O directed to LUN 1, track 0 and needs to obtain the track MD for LUN 1, track 0 from GM. At step 354, processing may be performed to determine the track MD page containing the track MD for LUN 1, track 0. In this example, the track MD page 0, 102, includes the track MD for LUN 1, track 0. At step 356, a determination is made as to whether the GM address for track MD page 0, 102 can be found by querying the page directory/local page table of the director. If step 356 evaluates to yes, the director obtains the desired track MD using the GM address for the track MD page 0, 102 as obtained from the page directory/local page table.

If step 356 evaluates to no, control proceeds to step 360 where processing is performed to determine the indirection layer page associated with the track MD for LUN 1, track 0 (e.g., where indirection layer page 0, 202, includes the GM address of track MD page 102 with the desired track MD for LUN 1, track 0). From step 360, control proceeds to step 366 to use the desired GM address (202*a*) for the track MD page 0 (102) as included in the indirection page 0 (202) to obtain the desired track MD for LUN1, track 0. Additionally, step 366 may include adding the GM address for the track MD page to the page directory/local page table of the director.

In connection with step 366 as described above, it is assumed that the desired track MD page is currently stored in GM. However, consistent with discussion herein regarding data that may be paged out of GM, it may also be the case that the desired track MD page is currently not paged into GM. If the desired track MD page is not currently stored in GM, the indirection layer page indicates the GM address for the desired track MD page is NULL or no GM address/no pointer. In this case, processing may include allocating a new page of storage from GM into which the desired track MD is then stored/copied into from the non-volatile storage.

Figure 7:
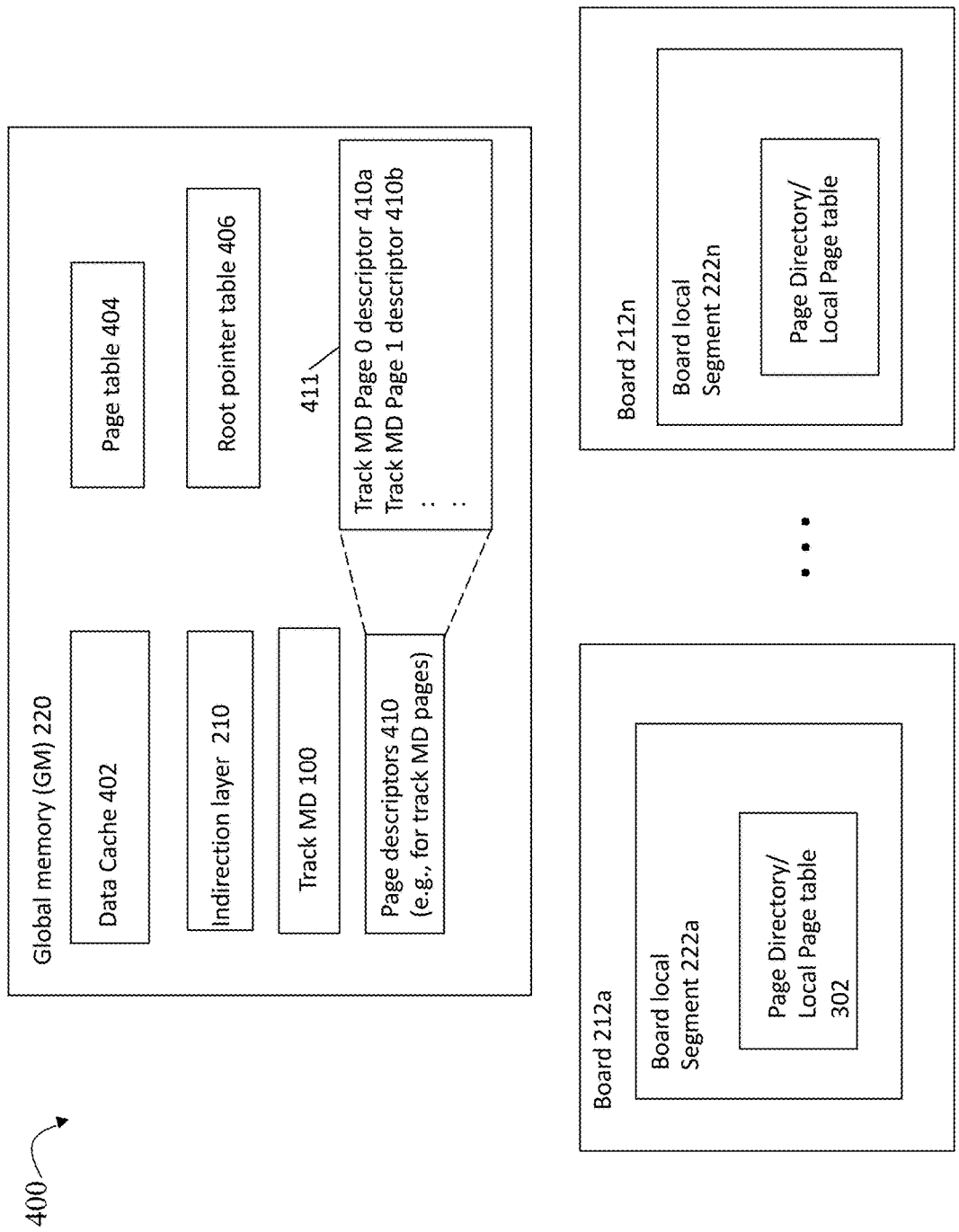
FIG. 7 is a block diagram illustrating an example of placement of various structures including data in GM and local page tables, according to embodiments of the invention.

Referring to FIG. 7, shown is an example illustrating a logical representation of components and structures stored therein in an at least one embodiment in accordance with techniques herein. In the example 400, GM 220 may be a logical representation of the distributed GM which, as described herein, comprises GM segments 220*a-n*, respectively, from boards 212*a-n*. The example 400 also illustrates in more detail structures that may be stored in board local segment 222*a* of board 212*a* and board local segment 222*n* of board 212*n*. Other board local segments of other boards may also include structures similar to that as illustrated for 212*a* and 212*n*.

The GM 220 may include data cache 402, indirection layer 210, page table 404 (e.g., global page table used to map GM addresses to corresponding physical GM locations such as mapping pages to page frames), root pointer table 406 (described in more detail elsewhere herein), and track MD 100 as described above. Consistent with use of local page tables on boards 212*a-n*, an embodiment in accordance with techniques herein may include a global page table 404 stored in GM 220 whereby each of the local page tables on boards 212*a-n* may be characterized in one aspect as locally caching page table information as may be stored in the global page table 404.

Additionally, in at least one embodiment, the GM 220 may also include page descriptors 410 for the pages of track MD as included in 100 when such pages are currently stored or paged into GM. Generally, pages including any type of data stored into GM may have an associated page descriptor. For example, in at least one embodiment, pages descriptors may also exist for all MD types including indirection MD pages (e.g., 202, 204, 206 of the indirection layer 210) stored in GM. Element 411 illustrates in more detail that page descriptors 410 may be a structure including a track MD page descriptor for each page of track MD in 100. Page descriptors 410 may include track MD page 0 descriptor 410*a* for track MD page 0 (102), track MD page 1 descriptor 410*b* for track MD page 1 (104), and so on, for each page of track MD in 100. Each of the page descriptors in 410 may include information generally used in an embodiment in accordance with techniques herein for a particular one of the pages of track MD included in 100. For example, in at least one embodiment, each page descriptor may include the following:

a key identifying or describing what is in the page, or otherwise indicating the page is free/not in use (e.g., key may identify the particular LUN and track MD page, or more generally the particular page of data that is stored in GM and associated with this page descriptor);

a lock (e.g., Used in connection with synchronizing and controlling access to the MD page);

a node mask identifying which boards have a reference to this page in their local page tables/page directories (e.g., Identifies which board/local page tables include a page table entry mapping this page to a corresponding GM address. This may be implemented, for example, as a bitmask with 1 bit for each board/each local page table that could potentially have a reference or GM address to this page); and a clean/dirty indicator (e.g., Indicates whether the GM copy of the page is the most recent and needs to be flushed/stored to physical storage devices or other non-volatile storage so that the non-volatile storage also includes the most recent/up to date copy of the MD of the page. Dirty indicates the GM copy needs to be flushed/is more recent copy of page MD, and clean indicates otherwise).

In at least one embodiment, the key of a page descriptor for a page including track MD for a particular LUN may include the MD object for the LUN and a relative page number for the page. For example, a LUN A may have MD object 1 and there may be 10 pages of track MD for the LUN A stored in 100. In this case, assuming the 10 pages of track MD for LUN A are currently paged into/stored in GM, 10 corresponding page descriptors may be included in 410 for the 10 pages of track MD for the LUN A. For page 1 of the 10 pages including LUN A's MD, its page descriptor may include the MD for LUN A and the page number 1. For page 2 of the 10 pages including LUN A's MD, its page descriptor may include the MD for LUN A and the page number 2. In at least one embodiment, the foregoing key may be used as the logical address mapped to a corresponding physical GM address by the page table 404 and also local page tables as stored on the boards 212*a-n*.

In connection with the above, the key may be used in connection with performing atomic compare and swap operations described in more detail below to synchronize access to pages of track MD 100 and the pages of the indirection layer 210. As known in the art, compare-and-swap (CAS) may be characterized as an atomic instruction used to achieve synchronization such as where there may be multiple entities (e.g., threads, processes, routines, directors, etc.) attempting to access a common resource, such as the distributed GM. CAS compares the contents of a memory location with a given value and, only if they are the same, modifies the contents of that memory location to a new given value. As described below, the CAS may use the contents of a location such as the key of the page descriptor, a page pointer field, and the like. As an atomic instruction, the CAS instruction may perform an operation on one or more memory locations "atomically" whereby such an atomic operation either succeeds or fails in its entirety. An embodiment in accordance with techniques herein may implement the CAS instruction or operation in software and/or hardware. For example, in at least one embodiment, the CAS operation or instruction may actually be an instruction in the processor instruction set. A CAS operation may require performing multiple comparisons and multiple updates/writes as an atomic operation.

Additionally, it should be noted that CAS operations as used herein to synchronize access to shared locations, such as page descriptors, and other data stored in GM is one type of operation that may be used for synchronization and control when accessing GM locations. More generally, an embodiment in accordance with techniques herein may use any suitable mechanism to enforce desired synchronization and access control to GM locations.

A CAS operation may implement the following logic as expressed in a C-like pseudocode below where * denotes access through a pointer:

```
function cas(p : pointer to int, old : int, new : int) returns bool {
    if *p ≠ old {           /* compare step */
        return false
    }
    *p ← new                /* modification step */
    return true
}
```

Thus, the CAS operation has an initial value, "old", for p, and a second later value, "new" for p. If the current value of p (in the compare step immediately prior to performing the update or modification of p in the modification step above) does not match "old", then there has been an intervening unexpected modification of p by another and therefore do not proceed with the modification step.

The node_mask mentioned above may be used to identify each of those boards having a local copy of the GM address of a particular MD page stored in the board local page table (e.g., 302). As described below, the node_mask may be used in connection with customizing and minimizing messages sent between boards. Once a particular board/local page table has been added to the bitmask thereby indicating it has a reference (e.g., pointer or GM address) to a particular page, as described in more detail below, the particular page cannot be paged out of GM without an acknowledgement from each board/local page table identified in the node_mask of the page.

Referring back to FIG. 7, each the board local segment, such as 222a, includes a page directory/local page table, such as 302, as discussed above such as in connection with FIGS. 6A and 6B. Additionally, each of the local page tables may identify the GM address of where the different indirection layer pages of the indirection layer 210 are stored in GM 220.

What will now be described are flowcharts of processing steps that may be performed in an embodiment in accordance with techniques herein. The flowcharts summarize processing as described above with additional detail included with steps using the CAS operation.

Figure 8:
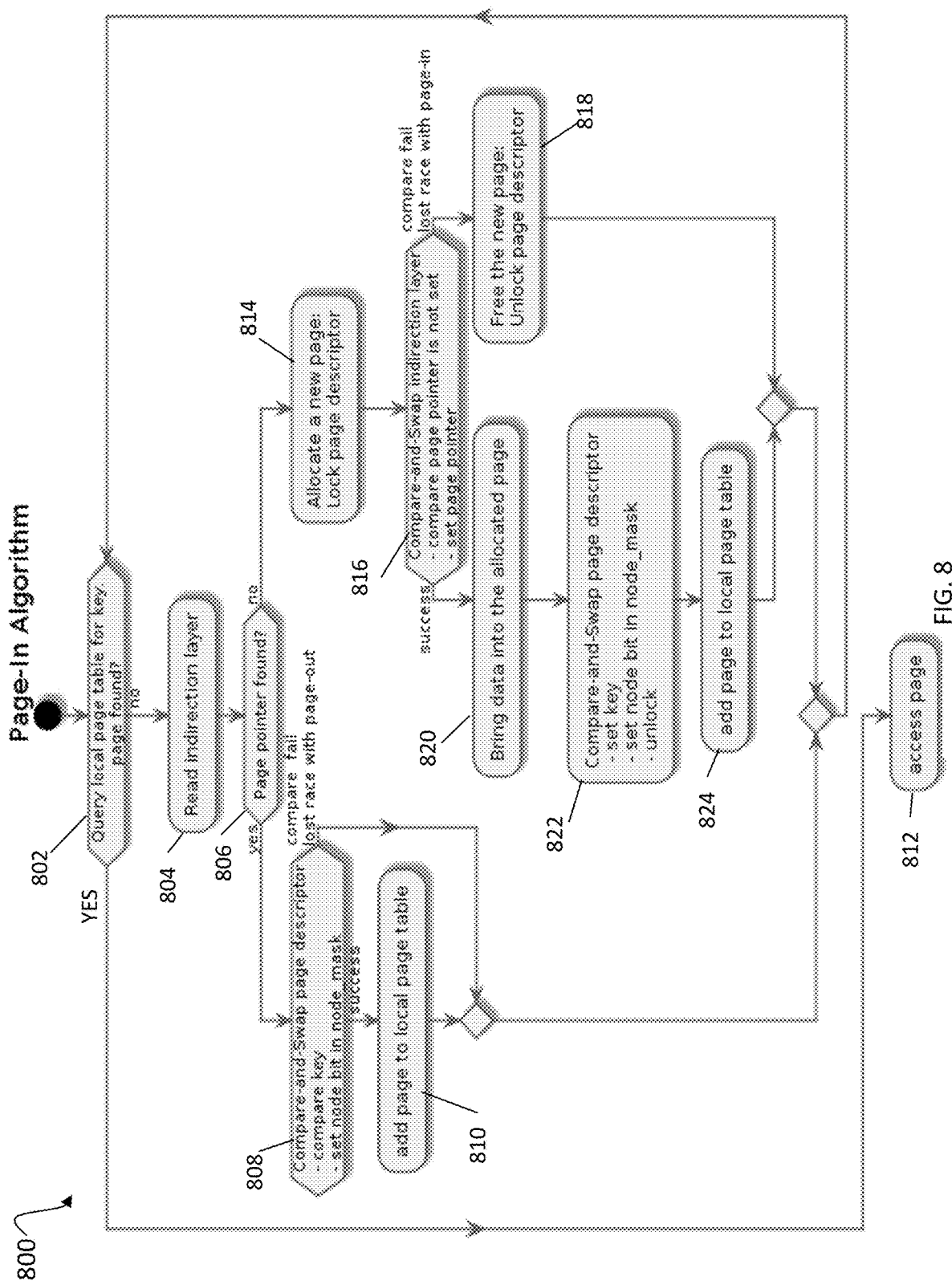

Referring to FIG. 8, shown is a flowchart illustrating a method 800 including processing steps that may be performed in connection with accessing track MD for a particular LUN and track on the LUN, according to embodiments of the invention. The method 800 includes logical similar to that as in connection with FIG. 6B. Method 800 may be performed by a director on a particular board having its local page table.

At step 802, the local page table is queried to determine whether the local page table includes a GM address for the LUN and track. Consistent with discussion elsewhere herein in at least one embodiment, step 802 may include determining the relative page number (with respect to the total number of MD pages for the LUN) of the track MD page containing the desired track MD (e.g., this is similar to step 354). Step 802 may include querying the local page table using the LUN MD object and relative page number to determine whether the local page table includes an entry mapping the LUN MD object and relative page number (denoting a logical address) to a corresponding GM address. If step 802 evaluates to yes, it means that the track MD page, containing the desired track MD for the LUN and track, is currently paged into GM at the returned GM address. As such, if step 802 evaluates to yes, control proceeds to step 812 to access the track MD page and obtain desired track MD for the LUN and track.

If step 802 evaluates to no, control proceeds to step 804. At step 804, the indirection layer is used to obtain the pointer or GM address of the track MD for the desired LUN and track (e.g., where the indirection layer page associated with the track MD includes the GM address of the track MD page with the desired track MD, as in step 360). Since the indirection pages may are also stored in GM, the local page table may also provide a mapping between the indirection layer page and its corresponding GM address. In this manner, the local page table may be queried in step 804 to obtain a GM address or pointer to the desired indirection page and then, from within the desired indirection page, the GM address or pointer to the desired track MD page. At step 806, a determination is made as to whether the GM address or pointer to the track MD page has been obtained. If step 806 evaluates to no, it means that the GM address or pointer to the desired track MD page was not found using the indirection layer and therefore the desired track MD is currently paged out of GM. If step 806 evaluates to yes, it means the desired track MD page (that contains the desired track MD) is currently paged into GM at the GM address or pointer found using the indirection layer.

If step 806 evaluates to yes, control proceeds to step 808. At step 808, a CAS operation is performed with respect to the key field and the node_mask of the page descriptor for the track MD page including the desired track MD for the LUN and track. Step 808 includes comparing the key field and setting the corresponding bit in the node_mask to for the local page table (to thereby indicate that the local page table as will be updated in step 810 contains a reference (e.g., GM or pointer) to the track MD page including the desired track MD. In step 808, the CAS operation ensures that there has been no modification to the key, and if there has been no modification to key, sets the bit in node_mask for the local page table/board containing the local page table. If the CAS instruction comparison has failed, control proceeds from step 808 to step 802. If the CAS instruction fails in step 808, it means that there has been a race condition with another access to the page out processing (as described in connection with FIGS. 10 and 11) to move the page out of GM. If the CAS instruction of step 808 succeeds, control proceeds to step 810 to update the local page table to add the GM address or pointer to the track MD page (e.g., add a valid entry in the local page table mapping the track MD page to its corresponding pointer or GM address). From step 810 control proceeds to step 802.

If step 806 evaluates to no, control proceeds to step 814 to allocate a new physical page of GM for storing the desired track MD page. In at least one embodiment, the particular physical page allocated from GM may be preferably allocated from the GM segment local to the director/board performing the processing of FIG. 8. Step 814 also includes locking the page descriptor for the newly allocated page of GM. In at least one embodiment, the pages of the track MD which may be paged in and out of GM may also have corresponding page descriptors (e.g., as included in 410, 411 of FIG. 7). Thus, the locking operation of step 814 may be performed with respect to the lock specified in the page descriptor for the newly allocated GM page. From step 814, control proceeds to step 816. At step 816, a CAS operation is performed with respect to the indirection layer page associated with the desired track MD page to ensure that the pointer field or entry of the indirection layer page has not been set or updated. For example, assume track MD page 102 is currently paged out of GM and includes the track MD needed for LUN 1, track 0. In this case, the indirection layer page 202 has field 202a which is null and the CAS operation in step 816 ensures that field 202a remains not set or null, and if so, sets the page pointer field 202a to point to or contain the GM address of the newly allocated GM page (allocated in step 814). At step 816, a determination is made as to whether the CAS operation has failed. If the CAS operation of step 816 fails, it indicates that current processing has lost an ongoing race condition with other ongoing processing to page in the same track MD page (e.g., lost race with another page-in process also executing steps of method 800 to page into GM the same track MD page).

If step 816 CAS operation fails, control proceeds to step 818 to free the previously allocated physical page of GM (previously allocated in step 814) and unlock the page descriptor (previously locked in step 814). From step 818 control proceeds to step 802.

If step 816 CAS operation succeeds, control proceeds to step 820 where the track MD page is stored in the newly allocated GM page (bring the track MD page into GM). From step 820, processing proceeds to step 822 to perform a CAS operation with respect to the page descriptor for the track MD page just paged into GM in step 820. Step 822 CAS operation ensures that the page descriptor has not been modified and if it has not been modified, then sets the key, sets the node_mask and also unlocks the page descriptor. The key may be set to denote the MD object and associated page number for the track MD page just paged into GM. Thus, in one aspect, setting the key as in step 822 effectively publishes information and indicates that the track MD page has now been paged into GM. The node_mask may be updated to set the corresponding bit to indicate that the local page table (that will be updated in step 824) contains a reference to the particular track MD page. The node mask in step 824 may be set in a manner similar to that as described in connection with step 808. From step 822, control proceeds to step 824 to update the local page table. Step 824 is similar to step 810. From step 824, control proceeds to step 802.

In connection with FIG. 8 processing as well as other processing described herein, if there is a modification or update to a MD page stored in GM and the modification or updated MD page that has not yet been flushed to non-volatile storage, then the indicator in the page's descriptor may be updated to dirty (e.g., to indicate the GM includes the most recent copy of the page's data that has not yet been stored on non-volatile storage). Once the page in GM has been flushed to non-volatile storage, the indicator may be updated to clean. Thus, referring back to FIG. 8 step 812, if the track MD page accessed is modified or updated, step 812 processing includes setting the page's indicator to dirty.

Figure 9:
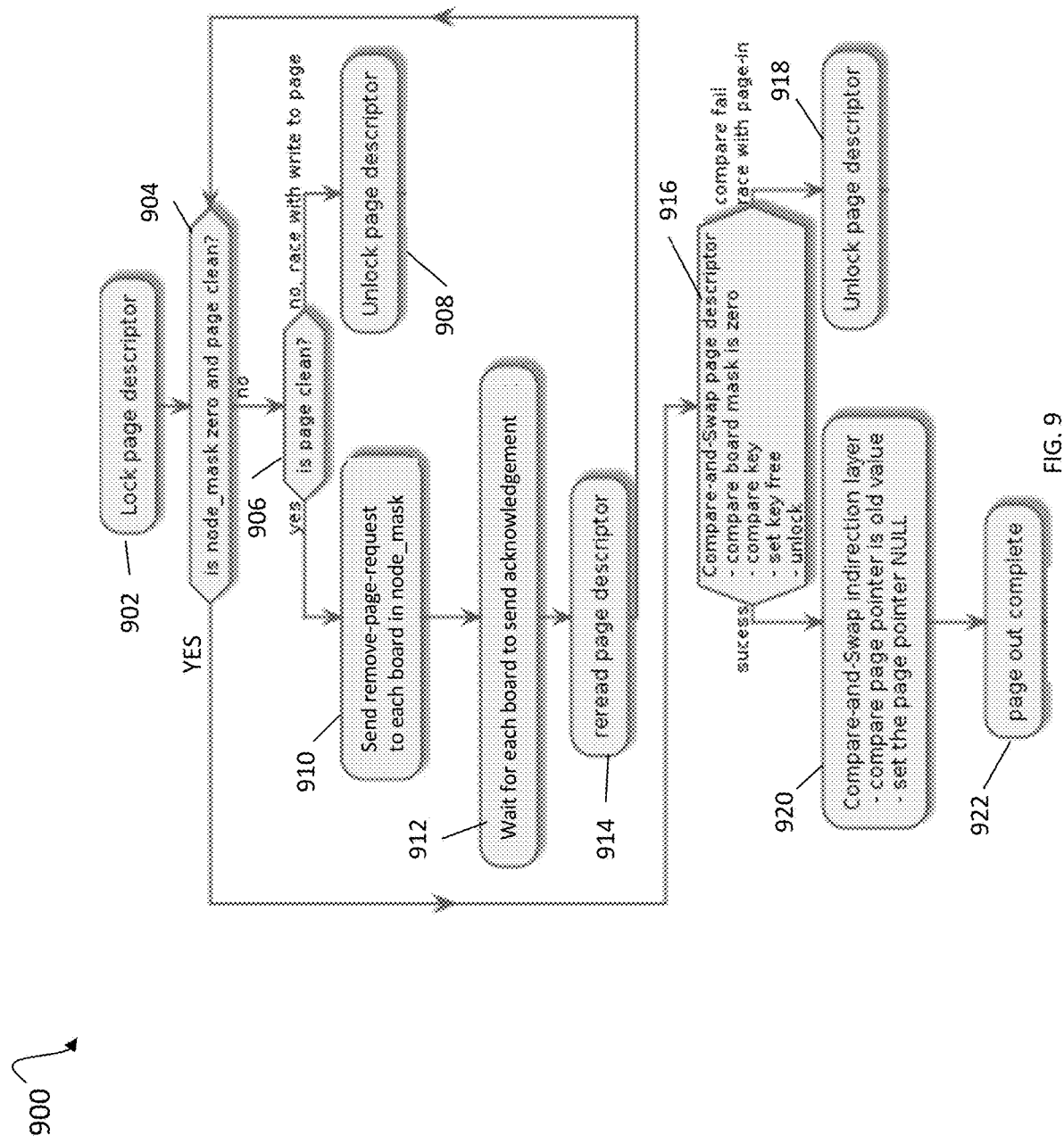

Referring to FIG. 9, shown is a flowchart illustrating a method 900 including processing steps that may be performed to page out, remove, or evict a page of MD from GM. At step 902, the page descriptor (of the page of MD being paged out of GM) may be locked. From step 902, processing proceeds to step 904 where a determination is made as to whether the node_mask of the page descriptor is zero and the indicator indicates the page is clean. A node_mask of zero indicates no bits are set whereby no local page table includes a reference to the page of MD now being paged out of GM.

If step 904 evaluates to yes, control proceeds to step 916 where a CAS operation is performed with respect to the node_mask and key of the page descriptor. The CAS operation ensures that the node_mask remains at zero and the key has not changed, and if so, 1) sets the key field to denote the physical GM page associated with the page descriptor is free for use and 2) unlocks the page descriptor. If the CAS operation of step 916 fails, it means that the comparison failed due to an ongoing race condition with a competing page-in (e.g., processing of FIG. 8). If the CAS operation of step 916 fails, control proceeds to step 918 where processing unlocks the page descriptor. If the CAS operation of step 916 succeeds, control proceeds to step 920 to perform another CAS operation with respect to the indirection layer. In particular, the CAS operation of step 920 attempts to clear out or initialize the appropriate pointer field (e.g., 202a) in the indirection page including the GM address or pointer to the page of track MD now being paged out or removed from GM. For example, referring to FIG. 5, if method 900 is attempting to remove the track MD page 0 102 from GM, step 920 ensures that the indirection layer page 202, entry 202a is the old value/has not been modified (e.g., remains equal to the GM address of the track MD page 0 102) and then, if so, sets the page pointer 202a to null. From step 920, processing proceeds to step 922 where the page processing is complete.

If step 904 evaluates to no, control proceeds to step 906 where a determination is made as to whether the GM page containing the current page of track MD being paged out is clean. If step 906 evaluates to no, control proceeds to step 908 to unlock the page descriptor. Step 906 evaluating to no denotes a competing race condition with other processing to write to the GM page. If step 906 evaluates to yes, control proceeds to step 910. In step 910, a remove-page-request is sent to each board identified in the node_mask as having a reference in its board-local page table to the GM page of track MD now being paged out of GM. Control proceeds to step 912 to wait for each board to send an acknowledgement in response to its corresponding received remove-page-request. From step 912, control proceeds to step 914 to reread the page descriptor. From step 914, control proceeds to step 904.

It should be noted that FIG. 9 processing to page out or remove a particular track MD page from GM may be performed responsive to an occurrence of a trigger condition, such as to increase the number of free GM pages responsive to the amount of GM available for use/free falling below a threshold level. The trigger condition may be, for example, responsive to processing performed in connection with GM memory management. For example, a free GM page may be needed for storing data and there may not be any available. As such, the GM memory management may perform processing to select a particular page of track MD for eviction (paged out) from GM.

Figure 10:
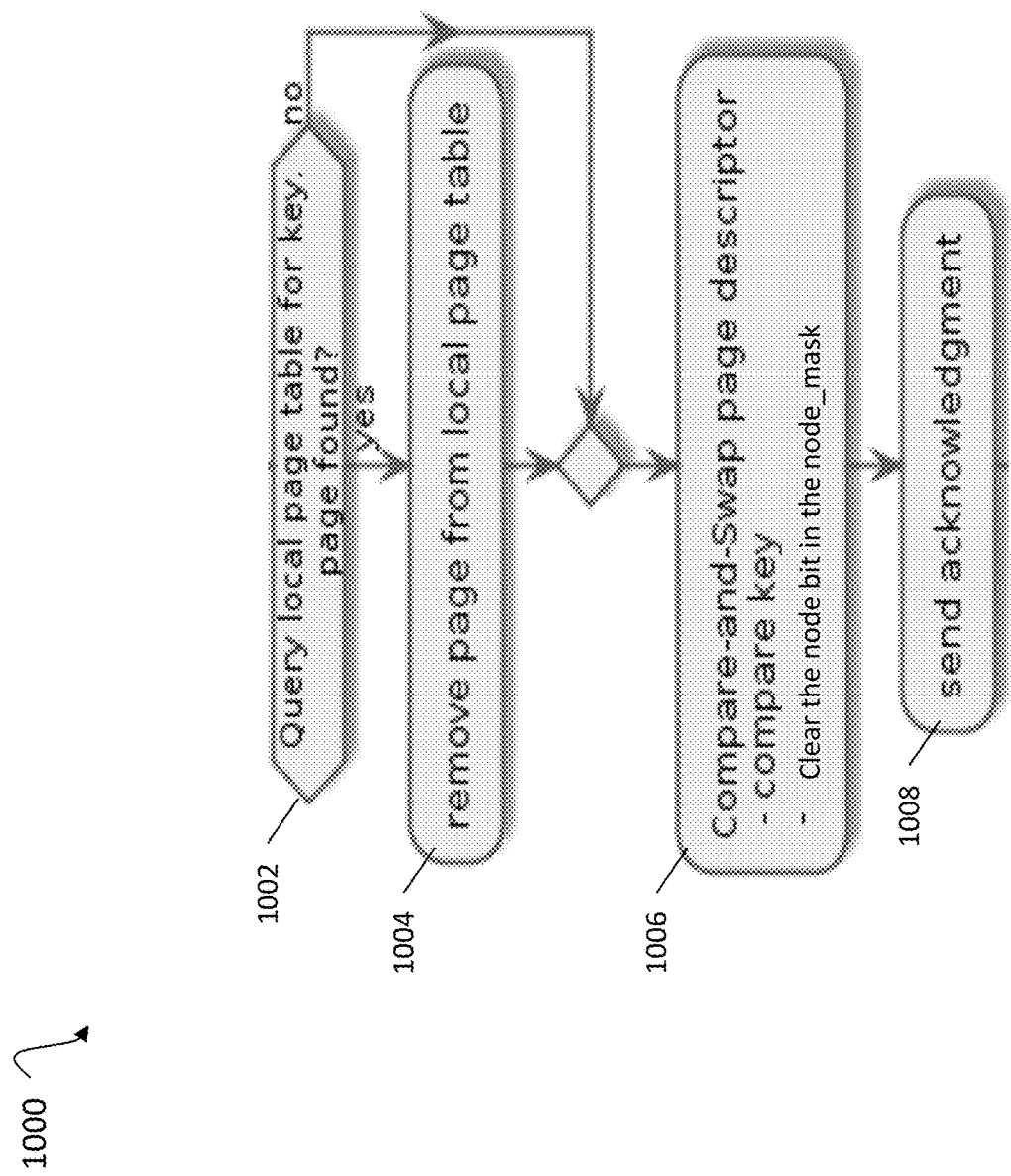

Referring to FIG. 10, shown is a method 1000 including processing steps that may be performed by each board receiving the remove-page request as issued in step 910 of FIG. 9. FIG. 10 processing removes the reference to (e.g., pointer to, or GM address of) a particular page of track MD from the board's local page table. The request received may identify the particular page of track MD and its associated pointer or GM address. At step 1002, processing is performed to query the local page table and determine whether the local page table contains the reference (pointer or GM address) for the particular page of track MD. If step 1002 evaluates to no, control proceeds to step 1006. If step 1002 evaluates to yes, control proceeds to step 1004 to remove the reference (pointer or GM address) for the particular page of track MD from the local page table. From step 1004, control proceeds to step 1006. At step 1006, a CAS operation is performed with respect to the page descriptor associated with the particular page of track MD. The CAS instruction compares the key of the page descriptor to ensure it has not been modified and, if it has not been modified, then clears a corresponding bit in the node_mask in the page descriptor to remove the board/local page table (thereby indicating that the local page table of the board that is performing processing of FIG. 10 no longer includes a reference (GM address or pointer) for the page of track MD being paged out of GM). From step 1006, processing proceeds to step 1008 where the acknowledgement is returned to the sender of the remove-page request.

In at least one embodiment in accordance with techniques herein, processing may also be performed to clean dirty pages (e.g., write out or flush dirty pages to non-volatile storage), and select which clean pages to page out of GM. Such processing to clean dirty pages may be performed responsive to any suitable conditions that may vary with embodiment. For example, processing to clean dirty pages may be performed periodically. The particular clean pages selected to be paged out of GM may be selected in accordance with any one or more suitable criteria that may vary with embodiment.

Figure 11:
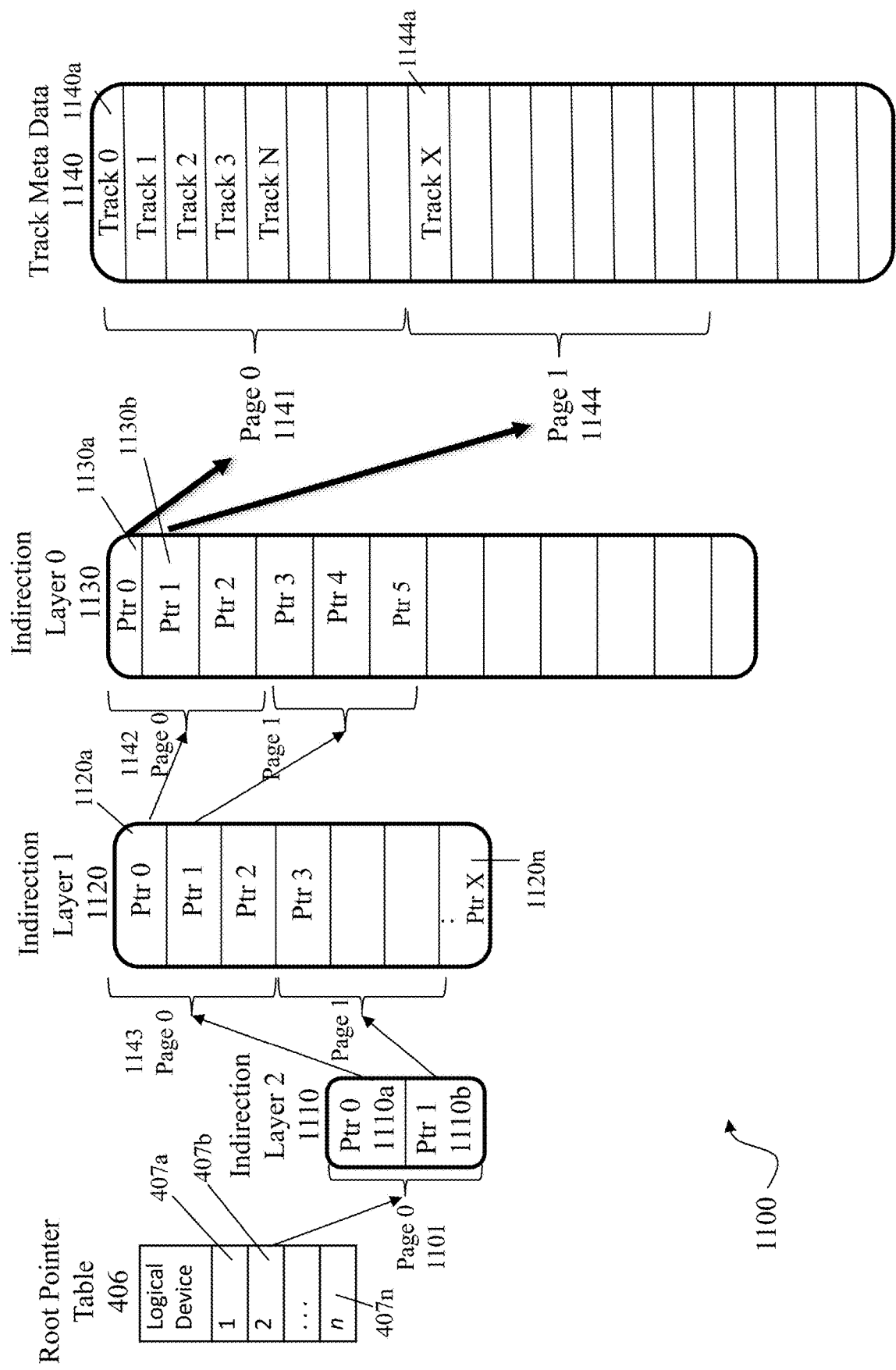
FIG. 11 is a block diagram illustrating an example of data structures, including indirection layers and a root pointer table that may be used according to embodiments of the invention.

Described above are techniques that may be used in an embodiment with a single indirection layer. More generally, multiple levels of indirection may be utilized rather than the single indirection layer, for example, if the single indirection layer becomes too large. Reference is made to FIG. 11 illustrating multiple data structures, including layers of indirection 1100 and a root pointer table 406 that may be used in embodiments of the invention. The example 1100 includes 3 indirection levels or layers 1110, 1120, 1130. Elements 1130 and 1140 may correspond respectively to indirection layer 210 and track MD 100 (e.g., such as described in connection with FIGS. 4-6). Elements 1110 and 1120 may be similar to indirection layer 1130 in that they each include pointers or GM addresses. However, element 1110 includes pointers or GM addresses 1110a-b to pages of indirection layer 1 pages; and element 1120 includes pointers or GM addresses 1120a-n to pages of indirection layer 0 pages. In at least one embodiment, each of the layers 1110, 1120 and 1130 along with the track MD 1140 may be stored in pages in GM. In at least one embodiment, pages of the indirection layer 2 1110 may be stored in GM and may remain resident in GM (e.g., not paged out of GM), and pages of remaining indirection layers 1120, 1130 and also track MD 1140 may be paged in and out of GM.

Root pointer table 416 may be configured to map logical devices to a highest indirection layer of a plurality of indirection layers, for example, indirection layer 2 1110 of indirection layers 1100. Each entry 407a-407n in root pointer table 417a-n may represent a logical device, and include an identifier of the respective logical device (e.g., by which the entry may be indexed), and may include a pointer or GM address to a page of the highest indirection layer corresponding to the logical device. For example, entry 407b represents a logic device having an identifier="2," and specifies the GM address of Page 0 1101 of indirection layer 2 1110.

Root pointer table 416 may be configured to remain resident in GM (e.g., and of the GMs described herein); i.e., to be static and not paged. As is described in more detail elsewhere herein, when determining the GM address for MD for a logical location within a logical device, it may be necessary to use a local page table (e.g., 302, 304 and 306) or host MD table (e.g., 730) to determine the GM address of one or more indirection layers (e.g., indirection layers 1110, 1120 and 1130). Configuring the root pointer table 406 to be static, so that it cannot be paged out of GM, may enable the GM address of MD for a logical location to be ultimately determined, even if all of the indirection layers are currently paged out of memory, using techniques described in more detail elsewhere herein. The GM address of the root pointer table 406 may be stored in one or more other data structures described herein, including any of local page table 302, 304 and 306 and host MD table 730, described in more detail elsewhere herein.

In the example 1100, indirection layer 2 1110 may be characterized as the highest or first indirection layer; indirection layer 1 1120 may be characterized as the second or middle indirection layer; and indirection layer 0 1130 may be characterized as the lowest, third or deepest indirection layer. When accessing a particular track MD page of 1140 through the indirection layers of FIG. 11, processing may traverse the layers 1110, 1120, 1130 in sequential order. Thus, a miss or fault with respect to a reference indirection layer page may occur with respect to any of the indirection layers 1120 and 1130 as well as the track MD 1140. In at least one embodiment, the local page table of each board may include references or pointers to the GM page(s) including the pointers of the highest or first indirection layer 1110. However, additional references or pointers to other pages of indirection layers 1120 and 1130 may be omitted from the local page tables of the boards. Consistent with discussion herein and in a manner similar to that as described in connection with indirection layer 210 and track MD 100, an embodiment may similarly map or associate each entry of indirection layer 1110 with particular pages of indirection layers 1120, 1130 and track MD 1140. Such mapping and association with a particular pointer or entry of 1110 may denote that the particular associated pages of 1120, 1130 and 1140 may be accessed by traversing or using the particular pointer or entry of 1110. For example, track MD page 1141 may be accessed by traversing or using in sequence 1110a, 1120a, 1130a. Thus, track MD page 1141 may be characterized in one aspect as associated with, or accessible using, 1110a, 1120a and 1130a. The particular pages of the different indirection layers 1120, 1130 and track MD 1140 accessible using a particular indirection layer 1110 entry (1110a, 1110b) may be calculated based on the number of pointers or GM addresses in each of 1110, 1120, 1130 included in each indirection layer page. It will be appreciated by those skilled in the art that more detailed processing as described herein with reference to a single indirection layer may be readily adapted and expanded for use with multiple indirection layers or levels, such as the 3 indirection layers in the example 1100. More generally, techniques herein may be used in connection with any suitable number of one or more indirection layers or levels and is not limited to only 1 layer (e.g., FIG. 5) or 3 layers (e.g., FIG. 11) as specifically illustrated herein. Generally, in at least one embodiment using multiple indirection layers or levels, the highest or first referenced indirection layer 1110 may not be paged out of GM (e.g., remains resident in GM) and paging may be supported/performed for the remaining subsequently referenced indirection layers (1220 1130) and also the track MD 1140. Also, more generally in an embodiment with multiple indirection layers, one or more of the layers (including the highest or first indirection layer such as 1110) may be designated as remaining GM resident and not subject to paging out of GM. Also, more generally in an embodiment with multiple indirection layers, one or more of the layers along with track MD may be subject to paging out of GM.

In at least one embodiment, a different set of indirection layers may be used to denote the particular pages of MD for each LUN. In such an embodiment, the particular indirection layers and/or track MD pages which remain resident or stored in GM (e.g., cannot be paged out of GM) may vary with each particular LUN. For example, for a first LUN A for which very high performance is desired, it may be that all pages of all indirection layers and all of the LUN A track MD remain resident in GM (not subject to being paged out of GM). A second LUN B which is not so designated as a high performance LUN may only have pages of indirection layer 2 designated as GM resident/not subject to being paged out of GM (e.g., pages of all other indirection layers and track MD for LUN B may be paged out of GM). A third LUN C may be designated as a medium performance LUN (mid performance between/related to LUN A and LUN C) whereby all pages of all indirection layers remain resident in GM (not subject to being paged out of GM) but LUN C's track MD may be subject to GM paging.

Consistent with the above example and discussion regarding multiple indirection layers, it is noted that track MD page 1141 may be accessed by traversing or using in sequence 1110a, 1120a, 1130a. In at least one embodiment, the foregoing sequence 1110a, 1120a, 1130a may be traversed in order after taking a miss on page 1141, then a miss on 1142 and then a miss on 1143 before falling back to reading a corresponding GM address or pointer 1110a (to page 1143) from page 0, 1101 of the indirection layer 2 1110 (e.g., where pages 1141, 1142 and 1143 are not currently stored in GM resulting in GM misses and also misses in connection with queries of the local page table). In at least one embodiment in accordance with techniques herein, the local page tables of each of the boards 212a-n may include corresponding entries for those pages of the indirection layers 1110, 1120, 1130 and also track MD 1140 currently stored in GM. As noted above, an embodiment may possibly page-out of GM pages of 1140 and also page-out pages of layers 1120 and 1130 but not pages of 1110. In this case, a local page table may include entries indicating corresponding GM addresses for page(s) of layer 1110 and also possibly for any of the pages of 1120, 1130 and 1140 (when pages of 1120, 1130, 1140 are paged into GM). Additionally, for pages of layers 1120 and 1130 and also 1140 not paged into GM, their corresponding pointers or GM addresses in entries of 1110, 1120 and 1130 may be null.

In connection with obtaining track MD from page 1141 in such an embodiment, consider, for example, by a director attempting to access MD of 1141. The director may perform processing as will now be described with reference to the flowchart 1200 of FIGS. 12A and 12B.

The director may perform processing including a first step 1202 of querying the director's local page table for the GM address of 1141 thereby resulting in not locating a GM address for 1141 (e.g., miss with respect to the local page table). In a second step 1204, processing may be performed (e.g., by the director) to determine the particular indirection page of indirection layer 0, 1130 that includes the pointer or GM address of track MD page 0, 1141. Consistent with discussion above, the second step processing may include determining the particular indirection page of 1130 based on calculations and known page sizes, GM address or pointer sizes, number of GM addresses or entries per page, and the like, of each layer. In this example, the second step determines that indirection layer 0 page 0 (1142) including entry 1130a includes the desired GM address of track MD page 0, 1141. In a third step 1206, the director may query its local page table for the corresponding GM address of the indirection layer 0, page 0 (1142) thereby resulting in not locating a GM address for 1142 (e.g., miss with respect to the local page table). In a fourth step 1208, processing may be performed (e.g., by the director) to determine the particular indirection page of indirection layer 1, 1120 that is associated with the desired track MD page 1142 (e.g., determine the entry 1120a/page 0 (1143) of 1120 that includes the pointer or GM address of page 0 (1142) of the indirection layer 0, 1130). In this example, the fourth step determines that indirection layer 1, page 0 (1143) includes entry 1120a with the desired GM address of indirection layer 0, page 0 (1142). In a fifth step 1210, the director may query its local page table for the corresponding GM address of indirection layer 1, page 0 (1143) thereby resulting in not locating a GM address of 1143 (e.g., miss with respect to the local page table). In a sixth step 1212, processing may be performed (e.g., by the director) to determine the particular indirection page of indirection layer 2, 1110 that is associated with the desired track MD page 1143 (e.g., determine the entry 1110a/page 0 of 1110 that includes the pointer or GM address of page 0 (1143) of the indirection layer 1, 1120). In this example, the sixth step determines that indirection layer 2, page 0 (1101) includes entry 1110a with the pointer or desired GM address of indirection layer 1, page 0 (1143). In a seventh step 1214, the director may query its local page table for the corresponding GM address of indirection layer 2, page 0 (1101) resulting in a hit (whereby the local page table returns the GM address of 1101).

At this point, an eighth step 1216 may be performed that includes calculating the particular entry 1110a or offset in 1101 with the pointer/desired GM address of 1143. In this example, it is determined that 1110a includes a null pointer thereby indicating a GM page fault with respect to 1143 and processing is performed in a ninth step 1218 to page into GM the indirection layer 1 page 0 1143 (e.g., including allocating a new GM page frame, initializing the newly allocated GM page frame with the data of page 1143, initializing an associated page descriptor, and other processing that may be performed in connection with paging data into GM).

In a tenth step 1220, processing may be performed that includes calculating the particular entry 1120a or offset in 1143 with the pointer/desired GM address of 1142. In this example, it is determined that 1120a includes a null pointer thereby indicating a GM page fault (e.g., page 1142 is currently paged out of GM/not stored in GM) and processing is performed in an eleventh step 1222 to page into GM the indirection layer 0 page 0 1142 (e.g., including allocating a new GM page frame, initializing the newly allocated GM page frame with the data of page 1142, initializing an associated page descriptor, and other processing that may be performed in connection with paging data into GM).

In a twelfth step 1224, processing may be performed that includes calculating the particular entry 1130*a* or offset in 1142 with the pointer/desired GM address of track MD page 0, 1141. In this example, it is determined that 1130*a* includes a null pointer thereby indicating a GM page fault and processing is performed in an thirteenth step 1226 to page into GM the track MD page 1141 (e.g., including allocating a new GM page frame, initializing the newly allocated GM page frame with the data of page 1141, initializing an associated page descriptor, and other processing that may be performed in connection with paging data into GM). At this point, based on further calculations for the desired track 0, it may be determined that offset or entry 1140*a* includes the desired track MD. In a fourteenth step 1228, the desired track MD 1140*a* may be obtained from track MD page 0, 1141.

Additionally, in connection with paging into GM any data page as described herein (e.g., such as for pages of 1120, 1130 and 1140), the local page table of the director performing the processing such as described above may be accordingly updated to reflect the GM addresses of such pages. Similarly, null entries of pages of the indirection layers may be updated as various indirection layer pages and/or track MD pages are paged into GM (e.g., steps 1218, 1222, 1226 also include, respectively, updating entries 1110*a*, 1120*a*, 1130*a*).

Figure 12A:
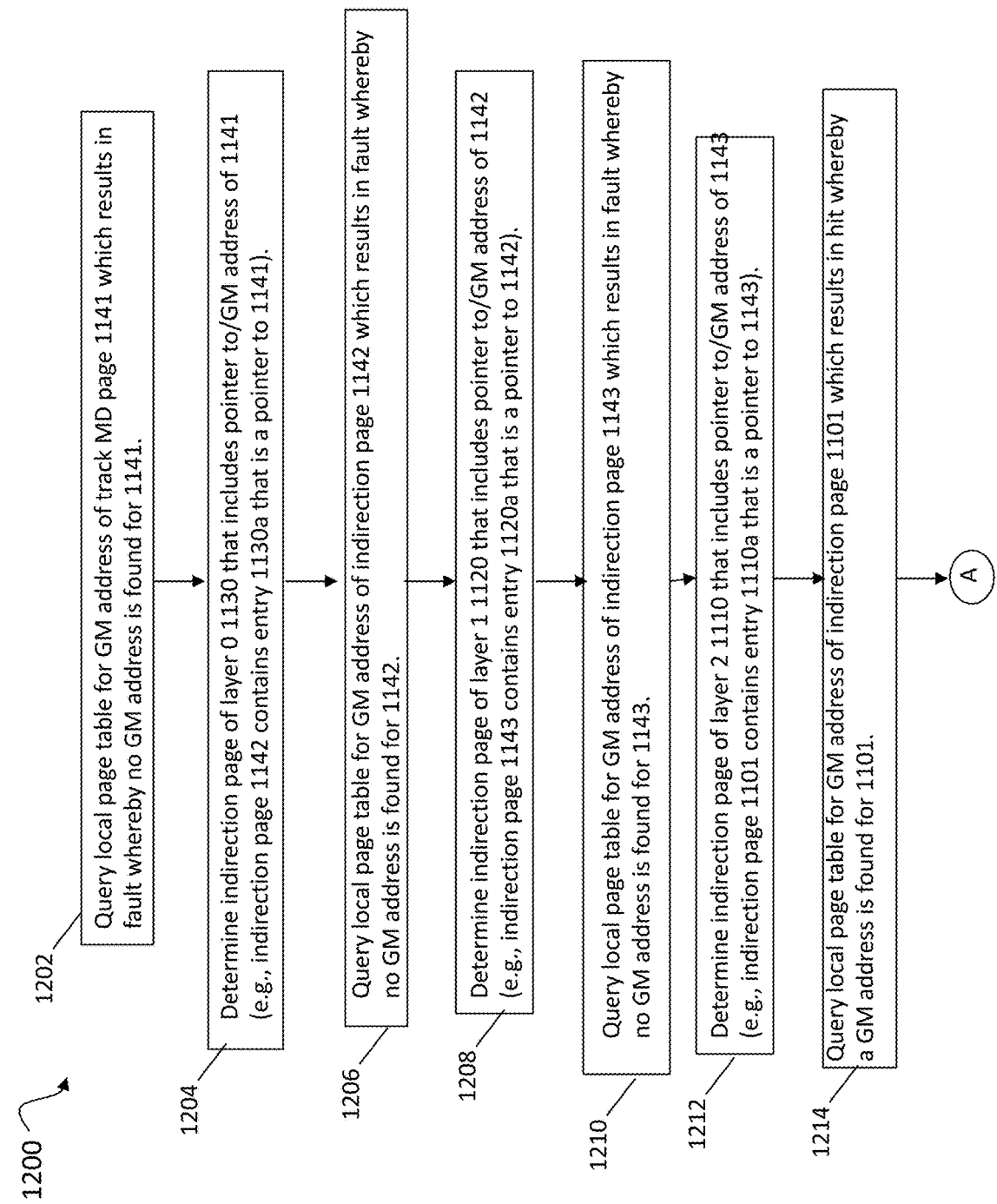
Figure 12B:
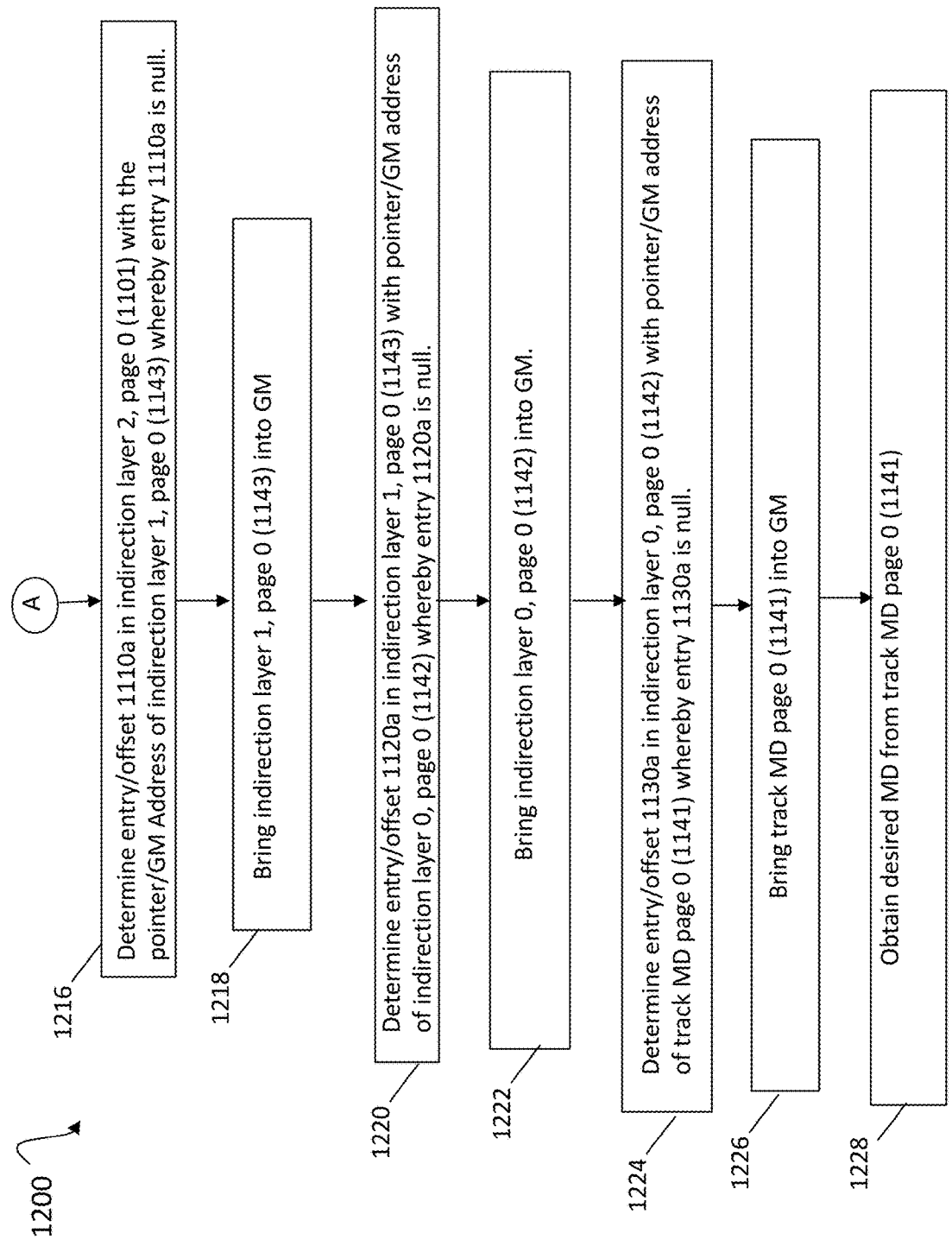

As will be appreciated by those skilled in the art in connection with FIGS. 12A and 12B, processing is described above where the desired page of track MD 1141 and indirection layer pages 1142, 1143 are all paged out of GM (e.g., whereby querying the local page table for GM addresses of the desired pages of track MD 1141 and indirection layer pages 1142, 1143 results in a miss with respect to the local page table). However, as will be appreciated by those skilled in the art, any one or more of the foregoing pages 1141, 1142, and 1143 may alternatively be paged into GM whereby the local page table would include valid GM addresses for such pages stored in GM. In such a case, processing may be performed commencing with the first such page encountered which is currently stored in GM. For example, assume page 1141 is paged out of GM but page 1142 is currently stored/paged into GM. In this case, the local page table query in step 1206 returns the GM address of 1142 (rather than a fault) whereby entry 1130*a* is null and processing is performed to bring 1141 into GM, accordingly, update entry 1130*a*, and obtain the desired track MD from track MD page 1141.

It should be noted that generally when paging data into GM, such as paging in the track MD, the track MD (or any other data being paged into GM) may be paged into GM from a source location that is any suitable source location. For example, consistent with discussion herein, the source location may be back-end physical non-volatile storage which is accessed by the BE as one possible form of non-volatile storage. More generally, an embodiment may store the MD on any form of non-volatile storage and access such MD as needed to be paged into and out of GM in any suitable manner. For example, in at least one other embodiment in accordance with techniques herein, the MD being paged into GM may be stored on a source location on non-volatile storage that is a form of flash-based physical storage included in memory cards, such as flash SLICs, of the data storage system. Additionally, in such an other embodiment where the track MD may be stored on flash SLICs, each of the directors or adapters (e.g., FAs, BEs, etc.) may access MD as needed from the flash SLICs. For example, each FA and BE may access the MD from a flash SLIC as needed by directly accessing the flash SLIC rather than obtaining such needed MD through the BE (as in the former embodiment noted above). Thus, for purposes of illustration, examples herein may refer to one particular embodiment in which the MD is stored on non-volatile back-end storage and retrieved by the BE. However, it will be appreciated by those skilled in the art that techniques described herein are not so limited to embodiments described herein for purposes of illustration and example.

In some embodiments of the invention, a host system is directly connected to an internal fabric of a storage system; i.e., the host is connected to the internal fabric without an intervening director (e.g., FA) or other component of the storage system controlling the host system's access to the internal fabric. For example, rather than a host system (e.g., host 14*a*) being physically coupled to a network (e.g., network 18), which is coupled to an FA (e.g., host adapter 21*a*), which is coupled to an internal fabric (e.g., internal fabric 30) of a storage system (e.g., storage system 20*a*), where the FA controls the host system's access to other components (e.g., GM 25*b*, other directors 37*a-n*) of the storage system over the internal fabric as illustrated in FIG. 1, the host system may be directly connected to the internal fabric, and communicate with other components of the storage system over the internal fabric independently of any FA or external network. In some embodiments, the host system may communicate with physical storage devices and/or GM over an I/O path that does not include any directors (e.g., FAs or BEs), for example, over the internal fabric to which the host system is directly attached. In embodiments in which at least a portion of the GM is considered part of a director, the host system may be configured to communicate with such GM directly; i.e., over the internal fabric and without use of director compute resources (e.g., a CPU core and/or CPU complex).

In some embodiments, the GM may include persistent memory for which data stored thereon (including state information) persists (i.e., remains available) after the process or program that created the data terminates, perhaps even after the storage system fails (for at least some period of time). In some embodiments, the internal fabric exhibits low latency (e.g., when IB is employed). In such embodiments, by enabling a host system to directly access GM of the storage system, which may include persistent memory, host systems may be configured to expand their memory capacity, including persistent memory capacity by using the memory of the storage system. Thus, a system administrator could expand the memory capacity, including persistent memory capacity of the hosts of a storage network without having to purchase, deploy and configure new host systems. Rather, the system administrator may configure existing host systems to utilize the GM of the storage system, and/or purchase, install and configure one or more SSIs on existing host systems, which may result in significant savings in time and cost. Further, because of the security advantages provided by the SSI described in more detail elsewhere herein, use of the GM may prove more secure than memory, including persistent memory, added to host systems to expand memory capacity.

In some embodiments, an SSI located externally to the storage system may be provided that serves as an interface between the host system and storage system. The SSI may be part of the host system, and in some embodiments may be a separate and discrete component from the remainder of the host system, physically connected to the remainder of the host system by one or more buses that connect peripheral devices to the remainder of the host system. The SSI may be physically connected directly to the internal fabric. In some embodiments, the SSI may be implemented on a card or chipset physically connected to the remainder of a host system by a PCIe interconnect.

A potential benefit of implementing an SSI as a physically separate and discrete component from the remainder of a host system is that the SSI's resources may be configured such that its resources are not available for any functions, tasks, processing or the like on the host system other than for authorized I/O processing. Thus, I/O performance may be improved and more deterministic, as SSI resources may not be depleted for non-I/O-related tasks on the host system. Further, as a physically separate and discrete component from the remainder of the host system, the SSI may not be subject to the same faults as the remainder of the system, i.e., it may be in a different fault zone from the remainder of the host system.

The SSI may provide functionality traditionally provided on storage systems, enabling at least some I/O processing to be offloaded from storage systems to SSIs, for example, on host systems. Metadata about the data stored on the storage system may be stored on the SSI, including any MD described herein. The SSI may be configured to determine whether an I/O operation is a read or write operation, and process the I/O operation accordingly. If the I/O operation is a read operation, the SSI may be configured to determine from MD whether the data to be read is in cache on the storage system. If the data is in cache, the SSI may read the data directly from cache over the internal fabric without use of CPU resources of a director, and, in some embodiments, without use of a director at all. If the data is not in cache, the SSI may determine, from the MD, the physical storage device and physical location (e.g., address range) therein of the data to be read. The data then may be read from the physical storage device over the internal fabric without use of a director. Data may be read from a cache or physical storage device to the SSI using RDMA communications that do not involve use of any CPU resources on the storage system, SSI or the host system (e.g., other parts thereof), thereby preserving CPU resources on the storage network.

The I/O processing capabilities of an SSI may be used to offload I/O processing from a storage system, thereby reducing consumption of I/O compute resources on the storage system itself. The overall storage compute capacity of a storage network may be increased without having to upgrade or add a storage system.

In some embodiments, an SSI may implement one or more technology specifications and/or protocols, including but not limited to, NVMe, NVMf and IB. For example, SSI may be configured to exchange I/O communications with the remainder of the host system in accordance with NVMe. In embodiments in which an SSI is configured to communicate in accordance with NVMe, as opposed to in accordance with a native platform (including an OS or virtualization platform) of the host system, significant development and quality assurance costs may be realized, as developing or upgrading an SSI for each new or updated native platform may be avoided. Rather, the native platform may conform to NVMe, an industry standard, and support an OS-native inbox NVMe driver.

In some embodiments, secure access to data on a storage system via direct connection to an internal fabric may be provided. An SSI may validate each I/O communication originating on the host system before allowing a corresponding I/O communication to be transmitted on the internal fabric. The validation may include applying predefined rules and/or ensuring that the I/O communication conforms to one or more technologies, e.g., NVMe. Additional security measures may include requiring validation of any SSI software or firmware before loading it onto the SSI, for example, using digital signatures, digital certificates and/or other cryptographic schemes, to ensure unauthorized code is not loaded onto the SSI that could enable unauthorized I/O activity on a storage system. Further, in some embodiments, the SSI may be configured to encrypt I/O communications originating on a host system and to decrypt I/O communications received from the storage system, for example, in embodiments in which data is encrypted in flight between the host system to physical storage devices, and data may be encrypted at rest in memory of the storage system and/or on physical storage devices.

In addition, data integrity (e.g., checksums) in accordance with one or more technologies (e.g., T10DIF) may be employed by the SSI on I/O communications exchanged between host systems and data storage systems, by which end-to-end data integrity between a host system and physical storage devices may be implemented, as described in more detail herein.

In some embodiments, in addition to an SSI communicatively coupled between a host operating system and an internal fabric of a storage system, a storage network may include an interface communicatively coupled between an internal fabric and a DAE that encloses a plurality of physical storage devices; i.e., a fabric-DAE interface ("FDI"). The FDI may be configured to employ any of a plurality of technologies, including NVMe, NVMf and IB, as described in more detail herein. In such embodiments, I/O communications configured in accordance with NVMe may be implemented end-to-end from a host system to physical storage device, as described in more detail herein.

As described in more detail herein, through an SSI, a host system may exchange I/O communications, including control information (e.g., commands) and data, with GM including cache along an I/O path including internal fabric without use of compute resources of any of directors. Further, through an SSI, a host system may exchange I/O communications, including control information (e.g., commands) and data, with physical storage devices along an I/O path including internal fabric and not including use of directors. Thus, an I/O path in a known storage network, which may include an HBA, an external network, an FA, an internal fabric, a BE, a PCI switch and a physical storage device, may be replaced with an I/O path in accordance with embodiments of the invention, which includes an SSI, an internal fabric, an FDI and a physical storage device. These new I/O paths, eliminating use of external networks and director compute resources (or directors altogether) may produce reduced response times for certain I/O operations, as described in more detail elsewhere herein.

By removing an external network from the I/O path between a host system and a storage system, and routing I/O requests (e.g., all I/O requests on a storage network) through one or more SSIs, the possible sources of malicious actions or human error can be reduced; i.e., the attack surface of a storage system can be reduced. Further, by implementing validation logic as described in more detail herein, in particular as close as possible (logically) to where an SSI interfaces with a remainder of a host system (e.g., as close as possible to physical connections to peripheral device interconnects), for example, within an NVMe controller, the storage system may be made more secure than known storage networks having I/O paths including external networks. To further reduce access to an SSI, an NVMe driver may be configured as the only interface of an SSI made visible and accessible to applications on a host system. Any other interfaces to an SSI, for example, required for administration, may be made accessible only through certain privileged accounts, which may be protected using security credentials (e.g., encryption keys).

It should be appreciated that, although embodiments of the invention described herein are described in connection with use of NVMe, NVMf and IB technologies, the invention is not so limited. Other technologies for exchanging I/O communications, for example, on an internal fabric of a storage system, may be used.

Figure 13:
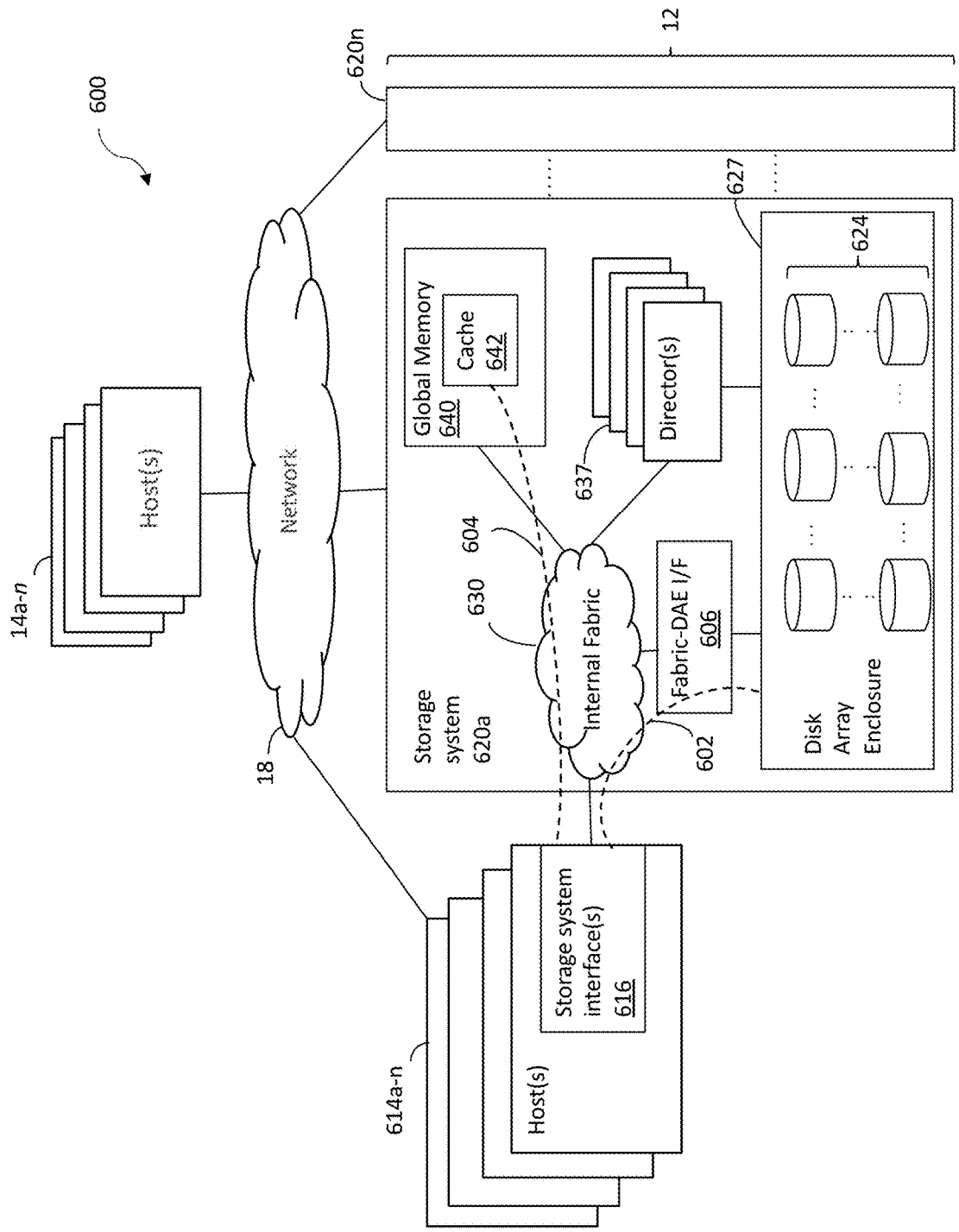
FIG. 13 is a block diagram illustrating an example of a data storage network, including one or more host systems directly connected to internal fabric of a storage system, according to embodiments of the invention.

FIG. 13 is a block diagram illustrating an example of a storage network 600 including one or more host systems 614a-n directly connected to an internal fabric 630 of a storage system 620a, according to embodiments of the invention. Other embodiments of a storage network including one or more host systems directly connected to an internal fabric of a storage system, for example, variations of system 600, are possible and are intended to fall within the scope of the invention.

Storage network 600 may include any of: one or more host systems 14a-n (described in more detail elsewhere herein); network 18 (described in more detail elsewhere herein); one or more host systems 614a-n; one or more storage systems 620a-n; and other components. Storage system 620a may include any of: GM 640 (e.g., any of 25b, 220a-n and/or 220); one or more directors 637 (e.g., 37a-n); a plurality of physical storage devices 624 (e.g., 24), which may be enclosed in a disk array enclosure 627 (e.g., 27); internal fabric 630 (e.g., internal fabric 30); FDI 606, other components; or any suitable combination of the foregoing. Internal fabric 630 may include one or more switches and may be configured in accordance with one or more technologies, for example, IB. In some embodiments, at least a portion of GM 640, including at least a portion of cache 642, may reside on one or more circuit boards on which one of the directors 637 also resides, for example, in manner similar to (or the same as) boards 212a-n described in relation to FIG. 2. In such embodiments, a director 637 may be considered to include at least a portion of GM 640, including at least a portion of cache 642 in some embodiments. FDI 606 may be configured to manage the exchange of I/O communications between host system 614a-n directly connected to internal fabric 630 and physical storage devices 624 (e.g., within DAE 627), as described in more detail elsewhere herein.

Each of host systems 614a-n may include SSI 616 connected directly to internal fabric 630 and configured to communicate with GM 640 and physical storage devices 624 (e.g., via FDI 606) over the internal fabric 630 independently of any of the directors 637 or any external network, for example, network 18. In embodiments in which one or more directors 637 may be considered to include at least a portion of GM 640, including at least a portion of cache 642 in some embodiments, SSI 616 may be configured to communicate with such GM 640, including cache 642, directly without use of any compute resources (e.g., of a CPU core and/or CPU complex) of any director 637. For example, SSI 616 may be configured to use RDMA as described in more detail herein. Thus, embodiments of the invention in which a host system, or more particularly an SSI, communicates directly with a GM or cache of a storage system include: the host system communicating with a portion of GM or cache not included in a director independently of any director; and/or the host system communicating with a portion of GM or cache included in a director independently of any compute resources of any director. In both cases, communicating directly with a GM or cache of a storage system does not involve use of any compute resources of the director.

The GM 640 may include persistent memory for which data stored thereon persists after the process or program that created the data terminates. For example, at least portions of GM may be implemented using DIMM (or another type of fast RAM memory) that is battery-backed by a NAND-type memory (e.g., flash). In some embodiments, the data in such persistent memory may persist (for at least some period of time) after the storage system fails.

As illustrated in FIG. 13, each of host systems 614a-n may be connected to any of storage system 620a-n through network 18, for example, through an HBA on the host. While not illustrated in FIG. 13, one or more of SSIs 616 may be connected to one or more other storage systems of storage systems 620a-n. It should be appreciated that any of hosts 614a-n may have both: one or more HBAs for communicating with storage systems 620a-n over network 18 (or other networks); and one or more SSIs 616 connected directly to an internal fabric of one or more storage systems 620a-n and configured to communicate with GM and physical storage devices over the internal fabric independently of any directors or external network.

One or more of the directors 637 may serve as BEs (e.g., BEs 23a-n) and/or FAs (e.g., host adapter 21a-n), and enable I/O communications between the storage system 620a and hosts 14a-n and/or 614a-n over network 18, for example, as described in relation to FIG. 1. Thus, a storage system 620a may concurrently provide host access to physical storage devices 624 through: direct connections to internal fabric 630; and connections via network 18 and one or more directors 637.

Figure 14:
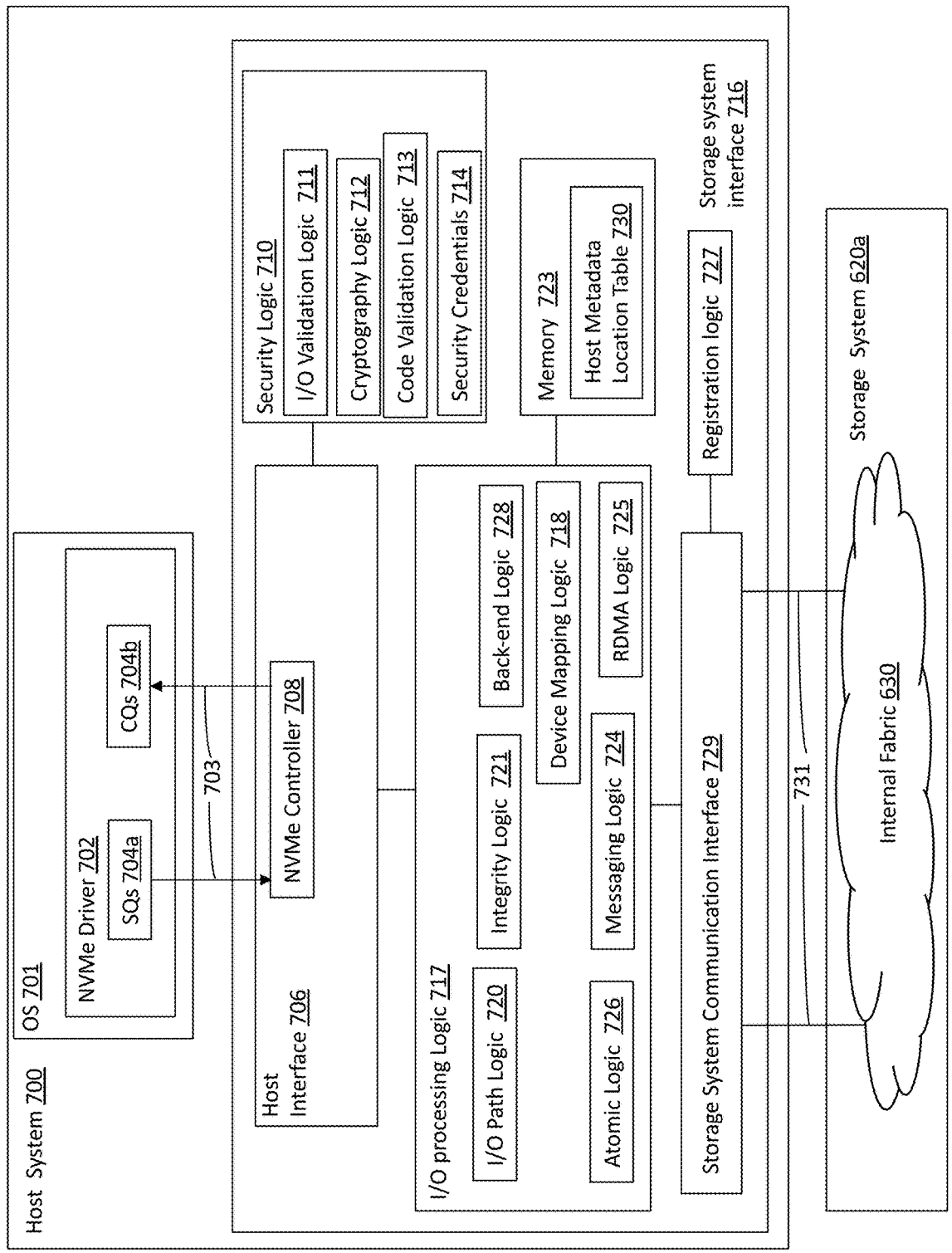
FIG. 14 is a block diagram illustrating an example of a storage system interface of a host system directly connected to internal fabric of a storage system, according to embodiments of the invention.

SSI 616 may be implemented as SSI 716 described in relation to FIG. 14. FIG. 14 is a block diagram illustrating an example of an SSI 716 of a host system 700 directly connected to an internal fabric 630 of a storage system, according to embodiments of the invention. Other embodiments of an SSI of a host system directly connected to an internal fabric of a storage system, for example, variations of SSI 716, are possible and are intended to fall within the scope of the invention.

Host system 700 (e.g., one of host systems 614a-n) may include any of: operating system (OS) 701; an SSI 716 (e.g., SSI 616); one or more peripheral device interconnects 703; other components; and any suitable combination of the foregoing. Host OS 701 may be configured to execute applications running on the host system, which may result in I/O operations for data stored on any of storage systems 620a-n, requiring I/O communications to be exchanged between the host system and the one or more storage systems 620a-n. Host OS 701 may be any suitable operating system for processing I/O operations, for example, a version of Linux, or a hypervisor or kernel of a virtualization platform, for example, a version of VMware ESXi™ software available from VMware, Inc. of Palo Alto, Calif. Other operating systems and virtualization platforms that support an NVMe driver may be used.

In some embodiments, SSI 716 may be physically separate and discrete from the remainder of host system 700, the remainder including the OS 701 of the host system and the hardware and firmware on which the OS 701 executes, and SSI 716 may be pluggable into host system 700, which may be physically configured to receive SSI 716. In such embodiments, the SSI 716 may be considered a first physical part of the host system, for example, a peripheral component or device of the host system, and the remainder of the host system may be considered a second physical part of the host system. For example, SSI 716 may be configured to physically connect to the other part of the host system 700 by the one or more peripheral device interconnects 703, which may be configured in accordance with one or more technologies (e.g., PCIe, GenZ, another interconnect technology, or any suitable combination of the foregoing). An interconnect configured to connect to, and enable communications with, a peripheral component or device may be referred to herein as a "peripheral device interconnect," and a peripheral device interconnect configured in accordance with PCIe referred to herein as a "PCIe interconnect." SSI 716 may be implemented on a card or chipset, for example, in the form of a network interface controller (NIC), which may be configured with additional logic as described herein such that the resulting device may be considered a smart NIC ("SmartNIC"). As is described in more detail herein, SSI 716 may include an operating system for executing one or more I/O-related functions. Thus, in some embodiments, a first one or more operating systems (e.g., host OS 701) may be executing applications (e.g., on first part of the host 700) that result in I/O operations, while SSI 716 includes one or more second operating systems for performing functions and tasks on SSI 716 in relation to processing such I/O operations, such functions and tasks described in more detail elsewhere herein.

In some embodiments, SSI 716 may be configured to communicate according to a PCIe specification over one or more peripheral device interconnects 703, and SSI 716 may be configured to communicate according to an NVMe specification such that the SSI 716 presents itself as one or more NVMe devices (e.g., drives) to the host system 700. For example, the host interface 706 may include an NVMe controller 708 configured to exchange I/O communication according to NVMe with NVMe queues within an NVMe driver 702 of OS 701. That is, the OS 701 of the host system 700 may include an NVMe driver 702 configured to exchange I/O communications with the NVMe controller 708 in accordance with NVMe. To this end, the NVMe driver 702 may include at least two I/O queues, including one or more submission queues (SQs) 704*a* for submitting commands via a peripheral device interconnect 703 (configured as a PCIe interconnect) to NVMe controller 708, and may one or more completion queues (CQs) 704*b* for receiving completed commands from NVMe controller 708 via one or more interconnects 703. Each SQ may have a corresponding CQ, and, in some embodiments, multiple SQs may correspond to the same CQ. In some embodiments, there may be up to 64K I/O queues in accordance with a version of the NVMe specification. The NVMe driver 702 also may include one or more admin SQs and CQs for control management in accordance with a version of the NVMe specification, and NVMe driver 702 and NVMe controller 708 may be configured to exchange control management communications with each other using admin SQs and CQs in accordance with a version of the NVMe specification.

SSI 716 may include any of: host interface 706; security logic 710; I/O processing logic 717; storage system communication interface (SSCI) 729; registration logic 727; memory 723; other components; or any suitable combination of the foregoing.

Registration logic 727 may be configured to register host system 700 and/or SSI 716 with storage system 620*a* when SSI 716 is connected to internal fabric 630, to enable future communication between the storage system 620*a* and internal fabric 630.

Security logic 710 may include any of: I/O validation logic 711; cryptographic logic 712; code validation logic 713; security credentials 714; other components; or any suitable combination of the foregoing. I/O validation logic 711 may prevent any undesired (e.g., invalid) communications from being further processed by SSI 716 or storage system 620*a*. Security logic 710, and more specifically I/O validation logic 711, may be a first component of SSI 716 to act on a communication received on one of the peripheral device interconnects 703, to ensure that any undesired communications do not proceed any further within SSI 716 and storage system 620*a*. To this end, it should be appreciated that one or more aspects of security logic 710, including I/O validation logic 711 and code validation logic 713, or portions thereof, may be implemented as part of host interface 706, for example, as part of NVMe controller 708.

I/O validation logic 711 may include logic that verifies that a communication received on one of peripheral device interconnects 703 is indeed an I/O communication authorized to be transmitted on SSI 716. For example, I/O validation logic 711 may be configured to ensure that a received communication is an I/O communication properly configured in accordance with NVMe, and to reject (e.g., discard or drop) any received communications not properly configured. Further, I/O validation logic 711 may be configured to allow only a certain subset of I/O operations, for example, read or write operations, and reject other I/O operations, for example, operations to configure storage and/or other storage management operations. Such stipulations may be captured as one or more user-defined rules that may be defined and stored (e.g., in a rules data structure) within SSI 716. It should be appreciated that rules may be specific to one or more storage-related entities, for example, users, groups of users, applications, storage devices, groups of storage devices, or other property values. Thus I/O validation logic 711 may be configured to implement any of a variety of business rules to control access to resources on storage system 620*a*.

Cryptographic logic 712 may be configured to encrypt data included in I/O communications received from host OS 701 and before repackaging the data (in encrypted form) in I/O communications transmitted over internal fabric 630 to components of storage system 620*a*. Cryptographic logic 712 also may be configured to decrypt data from I/O communications received from internal fabric 620*a* before sending the unencrypted data in I/O communication to host OS 701. Any of a variety of cryptographic schemes may be used, including use of symmetric and/or asymmetric keys, which may be shared or exchanged between SSI 716 of the host system, one of more storage systems 620*a-n*, and one or more SSIs of other host systems 614*a-n*, depending on what entities are entitled access to the data. For example, during a manufacturing and/or configuring of SSIs 716 and/or storage systems 620*a-n*, one or more encryption keys and/or other secrets (collectively, "security credentials") may be shared, to enable implementation of the given cryptographic scheme, and may be stored as part of security credentials 714.

In embodiments in which data is encrypted on SSI 716 before being transmitted to the storage system 620*a*, the data may be stored in encrypted form in physical storage devices 624 and/or GM 640. In such embodiments, directors 637 and other components that may be authorized to access the encrypted data also may be configured to implement whatever cryptographic scheme is being employed, which may be desirable for host systems (e.g., host systems 14*a-n*) that may access storage system 620*a* by means other than an SSI as described herein. In some known storage systems, physical storage devices may be self-encrypting drives that encrypt data received from BEs, and then decrypt the data when it is retrieved for BEs. This may be considered a form of data-at-rest encryption. In embodiments of the invention in which data is encrypted on SSI 716, and transmitted to physical storage devices 624 in encrypted form to be stored, it may be desirable that physical storage devices 624 do not employ their own encryption, as the data will arrive encrypted. That is, encrypting the already-encrypted data would be redundant, and a waste of processing resources. Further, self-encrypting drives may be more expensive than drives not including this feature. Thus, if there is no need for physical storage devices 624 to encrypt and decrypt data, physical storage device not having self-encryption, but otherwise having the same or similar capabilities, may be acquired at reduced cost.

By encrypting data on a host system, e.g., as part of an SSI 716, data may not only be able to be encrypted while at rest, but also while in transit. That is, in embodiments of the invention, data may be encrypted in transit on an I/O path from a host system to a physical storage device (i.e., end-to-end) as well as being encrypted at rest on a physical storage device or in memory (e.g., cache) of a storage system.

As described in more detail elsewhere herein, SSI 716 may be implemented in various combinations of hardware, software and firmware, including microcode. In some embodiments of SSI 716 implemented using software and/or firmware, the software and/or firmware, and updates thereto, may be subject to verification of digital signature before being allowed to be installed on SSI 716. For example, the security credentials 714 may include a public certificate that includes a cryptographic key (e.g., a public key of a PKI pair or the like), which may be embedded within the software and/or firmware initially installed on SSI 716 (e.g., at the manufacturer of SSI 716). The public certificate also may specify a validity period for the public certificate. Each subsequent update of the software and/or firmware may be digitally signed with a digital signature based on an encryption scheme (e.g., PKI) involving the public key.

When a purported software and/or firmware update is received at SSI 716 including a digital signature, code validation logic 713 may use the public key (and the validity period) in the public certificate to validate the digital signature and thereby verify the authenticity of the update, for example, by exchanging communications with a certification service or the like of the SSI 716 manufacturer or a trusted third-party, using known techniques. The security credentials 714, including the public certificate and perhaps other credentials, and credentials used for encrypting and decrypting data, may be embedded within the software and/or firmware on the SSI 716 so that they are not accessible by the host system 700 or any other entity connected to the SS1 716. For example, the security credentials 714 may be stored within a trusted platform module (TPM) or the like within SSI 716. If the code validation logic determines the software or firmware update to be invalid, the update may not be installed on SSI 716. Such verification of the software and/or firmware may prevent an attacker from replacing software and/or firmware on SSI 716 with code that would allow access to resources within storage system 620*a*.

Memory 723 may be used by one or more of the components of SSI 716 for storing information involved in providing functionality described herein, and may be part of a microprocessor or separate therefrom. Memory 723 may include host MD table 730. MD table 730 may include a plurality of entries, each entry representing a page of an indirection layer (e.g., 1110, 1120, 1130) or track MD 1140, where each entry may specify (e.g., via a pointer) a GM address corresponding to the page represented by the entry. For track MD pages, the GM address is the address of the page including MD corresponding to the page is stored. For indirection layers, the GM address is the address of the page including a link or pointer to a page of another indirection layer page or track MD page corresponding to the logical location. Each entry may include a logical location identifier, for example, a hash of the page of the indirection layer or track MD that it represents, by which the entry may be referenced.

MD table 730 may only include entries pertinent to recent I/O activity on the host system. For example, it may only include page information for indirection layers and/or track MD corresponding to logical locations specified in recent I/O operations. The size (e.g., number of entries) in the MD table 730 may be configurable based on a desired balance between memory consumption and performance, and may be adjusted from time to time, for example, based on recent I/O activity. This size adjustment may be done dynamically during performance of I/O operations (i.e., during "runtime"), for example, to consume only the amount of memory necessary; e.g., to only have entries for logical locations and/or logical devices having recent I/O activity, freeing up unneeded memory for other uses, which may improve I/O performance. In some embodiments, one or more (e.g., all) entries in the MD table 730 may be cleared in response to an event, e.g., user input, which may be done to free-up memory irrespective of recent I/O activity. Which entries remain in the MD table 730 when it is full and a new entry is added may be determined (e.g., by device mapping logic 718 or another component) based on an eviction policy (e.g., LRU), as described in more detail elsewhere herein. In some embodiments, to minimize memory consumption, the host system 700 may not include a host MD table 730, but rather only access one or more indirection layers (e.g., 1110, 1120, 1130) to determine MD GM addresses.

MD table 730 may be accessed and utilized by device mapping logic 718 in determining GM addresses for MD corresponding to logical locations specified in I/O operations, as described in more detail elsewhere herein. An embodiment of host MD table 730 is described in more detail in relation to FIG. 15.

I/O processing logic 717 may include one or more components for performing I/O operations in conjunction with storage system 620*a*. In some embodiments, one or more of these components embody I/O functionality, including data services, that is implemented on known storage systems. By implementing such I/O functionality on SSI 716 instead of on the storage system 620*a*, less storage system resources may be consumed, and overall I/O performance on the storage system may be improved. I/O processing logic 717 may include any of: device mapping logic 718; I/O path logic 720; integrity logic 721; messaging logic 724; RDMA logic 725; atomic logic 726; back-end logic 728; other components; or any suitable combination of the foregoing.

Device mapping logic 718 may be configured to map logical locations within logical devices specified in an I/O operation to physical locations (i.e., an address range) within physical storage devices. Device-mapping logic 718 may be configured to access host MD table to determine the GM address within GM 640 of MD for the logical location specified in an I/O operation, and to then access the GM address within GM 640 over internal fabric 630 without use of an director compute resources or external network (e.g., utilizing one or more other components of SSI 716). For example, device mapping logic 718 may be configured to perform variations of methods 350 and/or 800, in which host MD table is used instead of local page table 302, 304 or 306 to access one or more of data structures 100, 210, 402, 410, 500, 1110, 1120, 1130 and 1140 to determine the GM address of MD corresponding to the logical location (e.g., logical track) of a logical device (e.g., LUN).

Device mapping logic 718 may be configured to determine, from the retrieved MD, the location(s) within cache 642 and/or within one or more physical storage devices 624 corresponding to the logical location specified in the I/O operation. The I/O operation (e.g., read or write) then may be performed with respect to the determined cache location and/or one or more physical storage device locations. In some embodiments, the device mapping logic 718, in coordination with one or more other components of I/O processing logic 717, SSI 716 and/or host system 700, may perform aspects of I/O operations, including exchanging communications with components of storage system 620*a* over internal fabric 630, as described in U.S. patent application Ser. No. 16/389,383, titled "Host System Directly Connected to Internal Switching Fabric of Storage System," to Wigmore et al., filed Apr. 19, 2019 ("Wigmore"), the entire contents of which are hereby incorporated by reference.

It should be appreciated that, while in some embodiments described herein, the MD corresponding to a logical location may be used to determine a corresponding one or more locations in cache and/or physical storage location, the MD may include a variety of information other than location information, as described in more detail elsewhere herein, and may be used for any of a variety of other purposes, for example, by one or more components of host system 700 and/or storage system 620*a*.

I/O path logic 720 may be configured to determine what I/O path within storage system 620*a* to use to process an I/O operation. I/O path logic 720 may be configured to determine what path to take for an I/O operation based on any of a variety of factors, including but not limited to whether the I/O is a read or write; how complicated a state of the storage system is at the time the I/O operation is being processed; whether the data specified by the I/O operation is in a cache of the storage system; other factors; or a combination of the foregoing. For example, based on one or more of the foregoing factors, I/O path logic 720 may determine whether to process an I/O request by: sending a communication to a director; directly accessing a cache on the storage system (i.e., without using any compute resources of a director) or accessing a physical storage device without using a director (e.g., via an FDI). I/O path logic 720 may be configured to determine what I/O path within storage system 620*a* to use to process an I/O operation as described in more detail in Wigmore.

Integrity logic 721 may be configured to implement one or more data integrity techniques for I/O operations. Some data storage systems may be configured to implement one or more data integrity techniques to ensure the integrity of data stored on the storage system on behalf of one or more host systems. One such data integrity technique is called DIF (data integrity field), or "T10DIF" in reference to the T10 subcommittee of the International Committee for Information Technology Standards that proposed the technique. Some storage systems, for example, in accordance with one or more technology standards, store data arranged as atomic storage units called "disk sectors" having a length of 512 bytes. T10 DIF adds an additional 8 bytes encoding a checksum of the data represented by the remaining 512 byes, resulting in data actually being stored as 520-byte atomic units, including 512 bytes of data and 8 bytes of checksum data in accordance with T10DIF. In embodiments of the invention in which storage system 620*a* is implementing T10DIF, integrity logic 721 may be configured to implement T10DIF, thereby converting 512-byte units of data in I/O communications received from host OS 701 to 520-byte units of data in accordance with T10DIF to be transmitted in I/O communications to storage system 620*a*. In such embodiments, integrity logic 721 also may be configured to convert 520-byte units of data in I/O communications received from storage system 620*a* to 512-byte units of data to be transmitted in I/O communications to host OS 701. In such embodiments, data integrity on a storage network (e.g., storage network 600) may be improved by implementing T10DIF on an I/O path from a host system to a physical storage device (e.g., end-to-end).

Processing I/O operations in accordance with embodiments of the invention may include exchanging RDMA communications, control (e.g., command) communications and atomic communications between host system 700 and storage system 620*a*. RDMA logic 725, messaging logic 724, and atomic logic 726, respectively, may be configured to implement such communications. Atomic communications involve performing exclusive locking operations on memory locations (e.g., at which one or more data structures described herein reside) from which data is being accessed, to ensure that no other entity (e.g., a director) can write to the memory location with other data. The exclusive locking operation associated with an atomic operation introduces a certain amount of overhead, which may be undesired in situations in which speed is of greater performance.

It may be desirable for host system 700; e.g., SSI 716, to know information (e.g., a state) of one or more physical storage devices 624, for example, whether a physical storage device is off-line or otherwise unavailable, e.g., because of garbage collection. To this end, in some embodiments, back-end logic 728 may monitor the status of one or more physical storage devices 624, for example, by exchanging communications with FDI 606 over internal fabric 630.

SSCI 729 may include logic for steering and routing I/O communications to one or more ports 731 of SSI 716 physically connected to internal fabric 630, and may include logic implementing lower-level processing (e.g., at the transport, data link and physical layer) of I/O communications, including RDMA, messaging and atomic communications. In some embodiments of the invention, communications between SSI 716 and components of storage system 620*a* (e.g., directors 637, GM 640 and FDI 606) over internal fabric 630 may be encapsulated as NVMf command capsules in accordance with an NVMf specification. For example, SSCI 729 may include logic for encapsulating I/O communications, including RDMA, messaging and atomic communications, in accordance with NVMf. Thus, in some embodiments, I/O communications received from NVMe driver 702, configured in accordance with NVMe, may be converted to NVMf command capsule communications for transmission over the internal fabric 630. SSCI 729 also may include logic for de-capsulating NVMf command capsules, for example, into NVMe communications to be processed by I/O processing logic 717.

SSCI 729 (and components of the storage system 620a interfacing with the internal fabric 630) may be configured to address communication to other components; e.g., GM 640, FDI 606, directors 637, in accordance with one or more technologies being used to communicate over internal fabric 630. For example, in embodiments in which IB is employed to communicate over internal fabric 630, SSCI 729 may be configured to address communication to other components using IB queue pairs. Aspects of SSCI 729 may be implemented using a network adapter (e.g., card or chip), for example, a ConnectX®-5 dual-port network adapter available from Mellanox Technologies, Ltd. of Sunnyvale, Calif. ("Mellanox"), for example, as part of a SmartNIC.

SSI 716 may be implemented as a combination of software, firmware and/or hardware. For example, SSI 716 may include certain hardware and/or firmware, including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. SSI 716 may be part of a microprocessor or separate therefrom. In embodiments in which a microprocessor is employed, any suitable OS may be used to operate the microprocessor, including, for example, a Linux operating system. In some embodiments, the combination of software, hardware and/or firmware may constitute a system-on-chip (SOC) or system-on-module (SOM) on which SSI 716 may be implemented, e.g., as part of a SmartNIC. For example, in some embodiments, SSI 716 may be implemented, at least in part, using a BlueField™ Multicore System On a Chip (SOC) for NVMe storage, available from Mellanox, which may be further configured with logic and functionality described herein to constitute a SmartNIC.

Returning to FIG. 13, FDI 606 and one or more of physical storage devices 624 may be configured to exchange I/O communications in accordance with NVMe. Accordingly, FDI 606 may include an NVMe controller, e.g., at least similar to the NVMe controller 708, configured to exchange I/O communication according to NVMe with physical storage devices 624. Further, FDI 606 may be configured with the same or similar functionality as SSCI 729. For example, SSCI 729 may include: logic for steering and routing I/O communications to one or more of its ports physically connected to internal fabric 630, logic implementing lower-level processing (e.g., at the transport, data link and physical layer) of I/O communications, including RDMA and messaging communications; logic for encapsulating I/O communications to be sent from FDI 606 over internal fabric 630 to SSI 616, including RDMA and command messaging communications, in accordance with NVMf; logic for de-capsulating NVMf command capsules received from internal fabric 630, the decapsulated communication to be configured in accordance with NVMe for use by an NVMe controller of the FDI 606 for exchanging I/O communications with physical storage devices 624.

FDI 606 may be implemented as a combination of software, firmware and/or hardware including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. In some embodiments, the combination of software, hardware and/or firmware may constitute a system-on-chip (SOC) or system-on-module (SOM) on which FDI 606 may be implemented. For example, in some embodiments, FDI 606 may be implemented using a BlueField™ Multicore SOC for NVMe storage, available from Mellanox.

In some embodiments of the invention, aspects of the invention described in relation to FIGS. 1-12, for example, in relation to the storage network architecture illustrated in FIG. 1, may be implemented using the storage network 600, which may include host system 700. For example, device mapping logic 718 and/or other components of SSI 716 or system 700 may be configured to perform variations of methods 350, 800, 900, 1000 and 1200 using host MD table 730, as described in more detail elsewhere herein. For example, host MD table 730 may be used in a same or similar manner as local page tables 302, 304 and 306 to determine GM addresses of MD corresponding to logical locations specified in I/O operations. In such embodiments, one or more of the same data structures 100, 210, 302, 304, 306, 402, 404, 406, 410, 500, 1110, 1120, 1130 and 1140 may reside on storage system 620 (e.g., in GM 640) and be used in conjunction with the host MD table 730, or without using any host MD table, to determine GM addresses of MD corresponding to logical locations (e.g., logical tracks) within logical devices (e.g., LUNs).

In some embodiments, the host system 700 may exchange communications over the internal switching fabric 630 with GM 640 to access one or more indirection layers to determine a GM address of MD corresponding to a logical location specified in an I/O operation received on SSI 716, for example, without use of any compute resources of directors 637 or external network 18. In some embodiments, at least a portion of the one or more indirection layers themselves may be stored in GM 640. Device mapping logic 718 may query the host MD table 730 for a GM address of MD (e.g., a page of metadata) corresponding to a logical location specified in an I/O operation. If the host MD table does not include an entry for an MD page for the logical location, SSI 716 may access one or more indirection layers in GM 640 (as well as additional entries of MD table 730) to determine the GM address of the MD. In some embodiments, internal fabric 630 may exhibit low latency, resulting in relatively low-latency communications between SSI 716 and GM 640, such that the performance hit from accessing GM 640 on the storage system 620a, compared to accessing the host MD table, is relatively small. The size of host MD table—i.e., the number of entries and/or the amount of information stored therein—may be adjusted depending on the amount of memory available on SSI 716 and a desired balance between memory consumption on SSI 716 and I/O performance. In some embodiments, to minimize memory consumption, the host system 700 may not include a host MD table, in SSI 716 or otherwise, but rather only access the one or more indirection layers in GM 640 to determine GM addresses for MD. That is, there may be no MD footprint on the host system, and the host system may rely solely on memory resources of the storage system 620*a*, e.g., GM 640, to determine MD for logical locations of a logical device.

Figure 15:
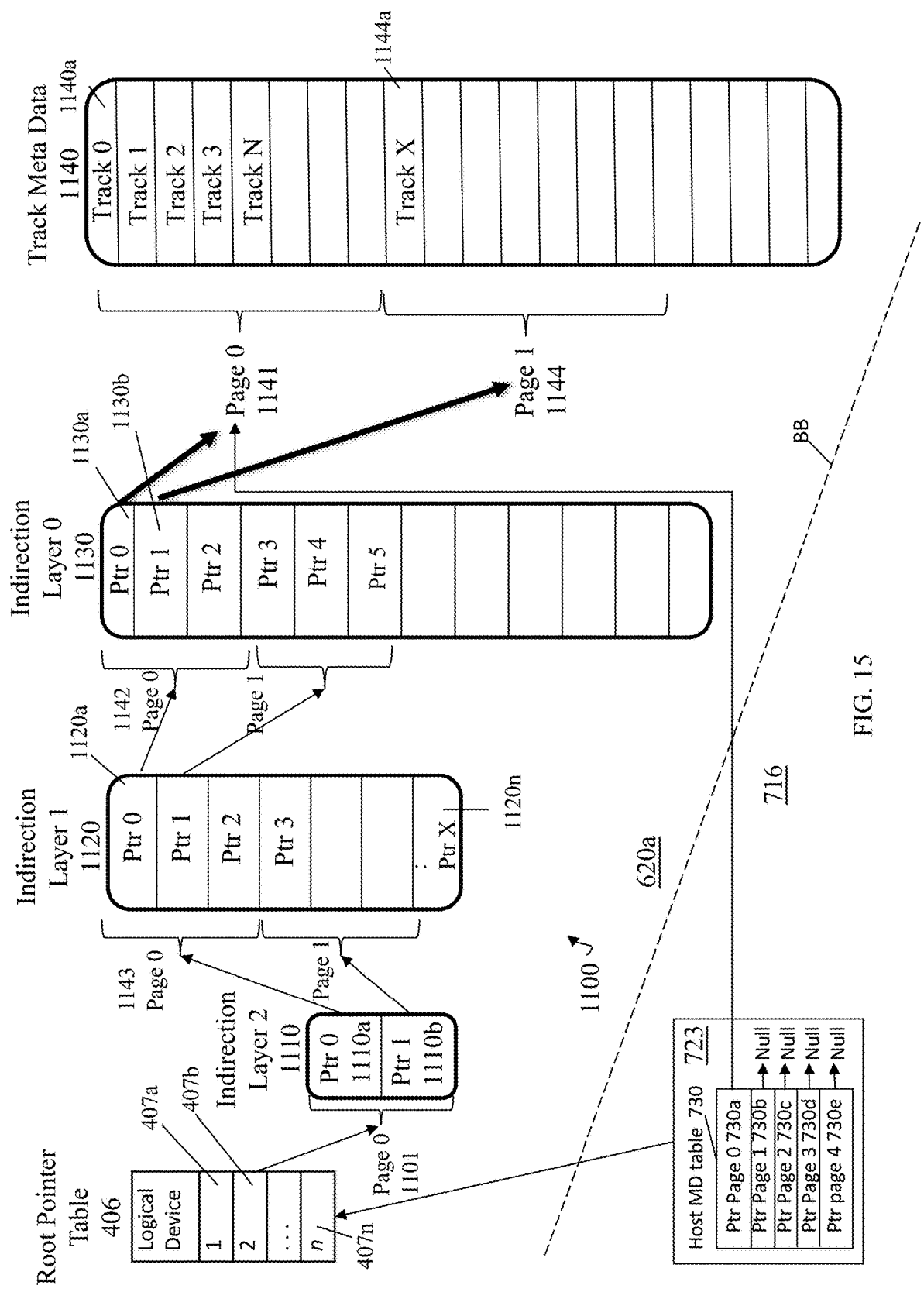
FIG. 15 is a block diagram illustrating an example of structures and information that may be used to determine global memory addresses of metadata, according to embodiments of the invention.

FIG. 15 is a block diagram, illustrating an example of structures and information, including host MD table that may be used to determine GM addresses of MD, according to embodiments of the invention. Other embodiments of structures and information that may be used to determine GM locations of MD, for example, variations of the structures and information illustrated in FIG. 15, are possible and intended to fall within the scope of the invention. Data structures 1110, 1120, 1130 and 1140 above dashed line BB may be stored in a GM of a storage system, for example, GM 640 of storage system 620*a*, e.g., which may be a distributed GM as described herein. MD table 730 may be stored in memory 723 of SSI 716.

MD table 730 may include GM addresses for a set of track MD pages and/or pages of one or more indirection layers. MD table 730 may include a plurality of entries, e.g., 730*a*-730*e*, each entry representing a page of track MD or of an indirection layer. For example, each entry may include, and be accessed or indexed by, an identifier (e.g., a hash) of an track MD page or indirection layer page. Each of the plurality of entries 730*a*-*n* may specify a GM address of a track MD page and/or or indirection layer page corresponding to a logical location, or a null value if no GM address is provided. For example, a GM address 730*a* may specific a GM address of the track MD page 0 1141. Table 730 is illustrated as including null values for pointers or addresses 730*b*-*e* to indicate table 730 does not include GM addresses to track MD pages 1, 2, 3 and 4 (e.g., 104 (or 1144), 106, 108 and 110).

As an example, assume a component of SSI 716 (e.g., device mapping logic 718) needs to obtain track MD for LUN 1, track 0, for example, in response to an I/O operation received from host OS 701. In this example, the SSI component may use host MD table to determine the track MD page containing the desired track MD, which, as illustrated in FIG. 15, is track MD page 0 1141. The SSI component may query host MD table to lookup the GM address of the desired track MD page number 0 for LUN 1. In this case, the SSI component determines that entry 730*a* of table 730 does include the GM address for track MD page 0, 1141. Using the GM address obtained from table 730, the SSI component may obtain the desired track MD from the particular entry 1140*a* in page 1141 of GM, such as by exchanging one or more communications with GM 640 over the fabric 630.

As another example, assume an SSI component (e.g., device mapping logic 718) needs to obtain track MD for LUN 1, track X, for example, in response to an I/O operation received from host OS 701. The SSI component may determine the track MD page containing the desired track MD, which based on FIG. 4 is track MD page 1, 1144. The SSI component then may query host MD table to lookup the GM address of the desired track MD for page 1. In this case, the SSI component may determine that entry 730*b* of table 730 does not include the GM address for track MD page 1 (e.g., there is a "miss" whereby the host MD table does not include the GM address of the desired track MD page number 1, 1144). Since table 730 does not include the GM address of the track MD page 1 1144, the SSI component may query or lookup the GM address of the desired track MD page 1, 1144 using one or more of the indirection layers 1110, 1120 and 1130, for example, in the same manner or similar manner as described in relation to method 1200 above. For example, it may be determined that the indirection page 0, 1142, of indirection layer 1130 contains the desired GM address of the track MD page 1 in entry 1130*b*. The SSI component then may obtain, e.g., from an entry of host MD table 730 (not shown) a GM address of 1130*a*, and, from page 1130*a*, the pointer to, or GM address of, track MD page 0 1144*a*. The SSI component may obtain the desired track MD from entry 1144*a* of page 1144 of GM. The foregoing use of indirection layer 1130, and accessing of MD in Track MD 1140 may include SSI 716 exchanging one or more communications with GM 640 over the fabric 630.

The immediately preceding example describes use of only a single indirection layer 1130, but it should be appreciated that determining the GM location for MD (e.g., a page entry of a page of track MD) for a logical location (e.g., logical track) within a logical device (e.g., LUN) may include accessing multiple indirections layers (e.g., 1130, 1120 and 1110), as described in more detail elsewhere herein.

In some embodiments of the invention, determining the GM address of MD corresponding to a logical location (e.g., logical track) of a logical device (e.g., LUN) may be performed on a host system (e.g., 700), for example, on an SSI (e.g., SSI 716) using a technique similar to, or the same as, described in relation to methods 350, 800 and/or 1200 in connection with FIGS. 6B, 8, 12A and 12B, using host MD table of a host system (e.g., SSI) instead of a local page table 302, 304 or 306, and communicating with GM 640 over internal fabric 630. In such embodiments, the same track MD 100 and/or 1140 and indirection layers 210 and/or 1130, 1120 and 1110 (including possibly more indirection layers), page descriptors 410 and data cache 402 may be used, but the host system may use host MD table 730 instead of local page tables 302, 304 and 306. For example, with respect to method 350, in step 356, it may be determined whether the GM address for a track MD page is in host MD table, rather than in a local page table 302, 304 or 306; and in step 366, the GM address for the MD page may be added to the host MD table 730. With respect to method 800, step 802 may query host MD table, and steps 810 and 824 may add a page to host MD table 730, instead of performing such steps on local page tables. With respect to method 1200, the queries of steps 1202, 1206, 1210, 1214 may be made of host MD table 730, and the determined MD page may be added to the host MD table, instead of performing these steps on a local page table.

The host MD table 730, or another location within memory 723, or another component of SSI 716 altogether, may be configured to include (e.g., to always include) a pointer or GM address for root pointer table 406. As described elsewhere herein, in at least one embodiment, the root pointer table 406 may be stored statically in GM such that it remains resident in GM (e.g., not paged out of GM), whereas pages of the indirection layers 1110, 1120, 1130 and also track MD 1140 may be paged in and out of GM. Knowing the GM addresses of the root pointer table 406 may enable the GM address of MD for a logical location to be ultimately determined, even if all of the other indirection layer pages and/or track MD pages corresponding to the logical location are paged out of GM, by applying the methods and techniques described in more detail elsewhere herein, e.g., method 1200 and variations thereof.

In some embodiments, device mapping logic 718 or another component of SSI 716 may be configured to obtain the static GM address of root pointer table 406 from host MD table 723 or elsewhere, and use an identifier of the logical device corresponding to an I/O operation as an index into the root table 406 to determine the GM of a page of the highest indirection layer corresponding to the logical device ID. For example, for an I/O operation for logical device "2," the device mapping logic 718 or another component of SSI 716 may determine, from entry 407b of root pointer table 406, the GM address of page 0 1101 of indirection layer 2 1110.

Further, in some embodiments, device mapping logic 718 or another component of SSI 716 may be configured to remove an entry from host MD table 730 similar to as described in relation to method 1000, for example, in response to a remove-page request in connection with paging out, removing or evicting a page of MD from GM (e.g., 640), similar to as described in relation to method 900, but for a host MD table 730, instead of local page table. For example, step 1002 may include querying host MD table 730, and step 1004 may include removing a page from host MD table 730, instead of performing these steps on a local page table.

In some embodiments, entries may be removed from host MD table 730 in accordance with an eviction policy for the host MD table 730, for example, independent of any storage system policy with respect to GM 640. For example, a least recently used (LRU) policy may be enforced, in which the least recently used (e.g., added or read) entry in table 730 is removed to make room for a new entry. For example, referring to FIG. 15, host MD table 730 may include 5 entries 730a-e (it should be appreciated that five entries are being used for illustrative purposes only, and table 730 may include more (perhaps significantly more) or less than five entries), and each entry 730a-e may include an active (i.e., non-null) entry. Entry 730b may be the last entry used (e.g., added or read), and entry 730d the penultimate entry used. Entry 730b then may be read, for example, in accordance with techniques described herein, and moved from the back (tail) to the front (head) of the LRU queue; entry 730d thereby becoming the least-recently used entry at the tail of the queue. When a next entry is added to host MD table 730, for example, in accordance with techniques described herein, the contents in entry 730d may be evicted, and populated with the new GM address (and perhaps other) information, and entry 730d moved to the head of the LRU queue.

In some embodiments of the invention, a host system may not include a host MD table, but still utilize one or more of the data structures on a storage system described herein to determine MD corresponding to a logical location within a logical device, for example, any of data structures 100, 210, 302, 304, 306, 402, 404, 406, 410, 500, 1110, 1120, 1130 and 1140. In such embodiments, a host MD table may not be included on a host system to preserve memory resources, while perhaps sacrificing performance to some degree as, for each I/O operation, determining metadata may include communicating with indirection layers on the host system rather than perhaps avoiding doing so if a local MD table is present and the GM address of the page corresponding to the logical location is present in the host MD table. In such embodiments, the same track MD 100 and/or 1240 and indirection layers 210 and/or 1130, 1120 and 1110 (including possibly more indirection layers), page descriptors 410 and data cache 402 may be used, but the host system may not include (or at least not use) host MD table 730. For example, with respect to method 350, steps 356 and 358 may be eliminated, and the method 350 may proceed from step 354 to step 360; and adding the GM address to the local page table in step 366 may be eliminated.

In such embodiments, with respect to method 800, steps 802, 810 and 824 may be eliminated, each of steps 808 and 822 may proceed to step 812, and step 818 may proceed to step 804. In such embodiments, with respect to method 1200, steps 1202-1214 may be eliminated, and the appropriate page entry of the highest indirection layer may be accessed as described in step 1216. It should be appreciated that in the illustrative embodiment of method 1200, pages of the non-highest indirection layers 1120 and 1130 and track MD 1140 are paged out of GM, requiring the bringing of the indirection layer page or track MD page into GM in steps 1218, 1222 and 1226, each of which steps may not be required if the respective indirection layer page or track MD page is present in (i.e., paged-in to) GM.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 350, 800, 900, 1000 and 1200, or parts thereof, including variations in which device mapping logic 718 and/or host MD table 730 are employed, may be implemented using one or more of the systems and/or data structures described in relation to FIGS. 1-6A, 7, 11 and 13-15, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of a host system processing an I/O operation, the method comprising:

receiving the I/O operation originating from an application and directed to a logical location within a logical storage device of a storage system, wherein the storage system includes: a global memory, an internal fabric, and at least one director that controls access to the global memory by the host system over the internal fabric, and wherein the host system is communicatively coupled to the storage system by one or more communication media located externally to the storage system; and the host system determining a global memory address within the global memory of the storage system at which first metadata corresponding to the I/O operation resides, including, if the global memory address is not available on the host system, the host system accessing at least a first indirection layer on the storage system, wherein accessing at least the first indirection layer includes the host system bypassing compute resources of any of the at least one director such that no director compute resources are used to access at least the first indirection layer, by exchanging one or more communications with the global memory of the storage system over the internal switching fabric of the storage system along a communication path from the host system to the global memory that does not include the compute resources of any of the at least one director.

2. The method of claim 1, wherein the host system includes a metadata table including one or more entries, each entry associated with a logical location of a logical storage device of the storage system, wherein the method further comprises:
querying the metadata table for the global memory address of the first metadata,
wherein the host system accessing the at least first indirection layer is performed responsive to determining that the metadata table does not include the global memory address of the first metadata.

3. The method of claim 2, wherein the metadata table has capacity to accommodate a predetermined number of entries, the method further comprising:
evicting one or more entries from the metadata table over time according to an LRU eviction policy.

4. The method of claim 2, further comprising:
adjusting a size of the metadata table to only have entries for logical locations and/or logical devices having recent I/O activity.

5. The method of claim 1, wherein the first metadata includes information specifying a physical location on a physical storage device mapped to the logical location.

6. The method of claim 1, wherein the first indirection layer includes a plurality of pointers to pages of metadata for the logical storage device, the method further comprising:
accessing, in global memory, a page descriptor corresponding to a first page of the pages of metadata, the page descriptor specifying: data stored in the first page, or that the first page is free.

7. The method of claim 1, wherein a plurality of indirection layers include the first indirection layer, and wherein the plurality of indirection layers are used to obtain the global memory address of the first metadata.

8. A host system having one or more applications running thereon, the execution of the one or more applications resulting in I/O operations involving data stored on a storage system having an internal switching fabric, the host system comprising:
one or more processors;
a memory comprising code stored thereon that, when executed, performs a method comprising:
receiving an I/O operation originating from a first application of the one or more applications and directed to a logical location within a logical storage device of the storage system, wherein the storage system includes: a global memory, an internal fabric, and at least one director that controls access to the global memory by the host system over the internal fabric, and wherein the host system is communicatively coupled to the storage system by one or more communication media located externally to the storage system; and
determining a global memory address within the global memory of the storage system at which first metadata corresponding to the I/O operation resides, including, if the global memory address is not available on the host system, accessing at least a first indirection layer on the storage system,
wherein accessing at least the first indirection layer includes bypassing compute resources of any of the at least one director such that no director compute resources are used to access at least the first indirection layer, by exchanging one or more communications with the global memory of the storage system over the internal switching fabric along a communication path from the host system to the global memory that does not include the compute resources of any of the at least one director.

9. The host system of claim 8, wherein the host system further comprises a metadata table including one or more entries, each entry associated with a logical location of a logical storage device of the storage system,
wherein the method further comprises querying the metadata table for the global memory address of the first metadata, and
wherein the host system accessing the at least first indirection layer is performed responsive to determining that the metadata table does not include the global memory address of the first metadata.

10. The host system of claim 9, wherein the metadata table has capacity to accommodate a predetermined number of entries, and
wherein the method further comprises evicting one or more entries from the metadata table over time according to an LRU eviction policy.

11. The host system of claim 9, the method further comprising:
adjusting a size of the metadata table adjusting a size of the metadata table to only have entries for logical locations and/or logical devices having recent I/O activity.

12. The host system of claim 8, wherein the first metadata includes information specifying a physical location on a physical storage device mapped to the logical location.

13. The host system of claim 8, wherein the first indirection layer includes a plurality of pointers to pages of metadata for the logical storage device, and
wherein the method further comprises accessing, in global memory, a page descriptor corresponding to a first page of the pages of metadata, the page descriptor specifying: data stored in the first page, or that the first page is free.

14. The host system of claim 8, wherein a plurality of indirection layers include the first indirection layer, and wherein the plurality of indirection layers are used to obtain the global memory address of the first metadata.

15. For a system including a host system and a storage system, the host system having one or more applications running thereon, the execution of the one or more applications resulting in I/O operations involving data stored on the storage system, one or more non-transitory computer-readable media, the non-transitory computer-readable media having software stored thereon comprising:
executable code that executes on the system and that receives an I/O operation originating from an application and directed to a logical location within a logical storage device of the storage system, wherein the storage system includes: a global memory, an internal fabric, and at least one director that controls access to the global memory by the host system over the internal fabric, and wherein the host system is communicatively coupled to the storage system by one or more communication media located externally to the storage system; and
executable code that executes on the system and that determines a global memory address within the global memory of the storage system at which first metadata corresponding to the I/O operation resides, including, if the global memory address is not available on the host system, accessing at least a first indirection layer on the storage system, wherein executable code that accesses at least the first indirection layer includes executable code that initiates bypassing compute resources of any of the at least one director such that no director compute resources are used to access at least the first indirection layer by exchanging one or more communications with the global memory of the storage system over the internal switching fabric along a communication path from the host system to the global memory that does not include the compute resources of any of the at least one director.

16. The one or more non-transitory computer-readable media of claim 15, wherein the host system includes a metadata table including one or more entries, each entry associated with a logical location of a logical storage device of the storage system, wherein the software further comprises:

querying the metadata table for the global memory address of the first metadata, wherein the host system accessing the at least first indirection layer is performed responsive to determining that the metadata table does not include the global memory address of the first metadata.

17. The one or more non-transitory computer-readable media of claim 16, wherein the metadata table has capacity to accommodate a predetermined number of entries, the software further comprising:

evicting one or more entries from the metadata table over time according to an LRU eviction policy.

18. The one or more non-transitory computer-readable media of claim 16, the software further comprising:

adjusting a size of the metadata table adjusting a size of the metadata table to only have entries for logical locations and/or logical devices having recent I/O activity.

19. The one or more non-transitory computer-readable media of claim 16, wherein the first metadata includes information specifying a physical location on a physical storage device mapped to the logical location.

20. The one or more non-transitory computer-readable media of claim 15, wherein the first indirection layer includes a plurality of pointers to pages of metadata for the logical storage device, the software further comprising:

accessing, in global memory, a page descriptor corresponding to a first page of the pages of metadata, the page descriptor specifying: data stored in the first page, or that the first page is free.

* * * * *